US012744442B2

(12) United States Patent
Ang et al.

(10) Patent No.: US 12,744,442 B2
(45) Date of Patent: Sep. 22, 2026

(54) ACTUATION SYSTEMS AND METHODS

(71) Applicant: ILLUMINA, INC., San Diego, CA (US)

(72) Inventors: Beng Keong Ang, Singapore (SG); Heng Kuang Cheng, Singapore (SG); Boon Kheng Lim, Singapore (SG); Jian Kai Tan, Singapore (SG); Ai Wee Lee, Singapore (SG); Jia Zhi Lim, Singapore (SG)

(73) Assignee: ILLUMINA, INC., San Diego, CA (US)

( * ) Notice: Subject to any disclaimer, the term of this patent is extended or adjusted under 35 U.S.C. 154(b) by 288 days.

(21) Appl. No.: 18/674,459

(22) Filed: May 24, 2024

(65) Prior Publication Data

US 2024/0396419 A1 Nov. 28, 2024

Related U.S. Application Data

(60) Provisional application No. 63/469,247, filed on May 26, 2023.

(51) Int. Cl.
*H02K 41/02* (2006.01)

(52) U.S. Cl.
CPC .................................... *H02K 41/02* (2013.01)

(58) Field of Classification Search
CPC ............... F03G 7/0614; F03G 7/06143; F03G 7/06145; F03G 7/06147; H02K 41/02
See application file for complete search history.

(56) References Cited

U.S. PATENT DOCUMENTS

2022/0163020 A1* 5/2022 Schoch ............... F03G 7/06143

FOREIGN PATENT DOCUMENTS

| | | | |
|---|---|---|---|
| KR | 10-1233061 B1 | 2/2013 |
| KR | 10-2014-0106578 A | 9/2014 |
| KR | 10-2016-0090740 A | 8/2016 |
| KR | 10-2020-0028891 A | 3/2020 |
| WO | WO-2022/108813 A1 | 5/2022 |

* cited by examiner

*Primary Examiner* — Alexander A Singh
(74) *Attorney, Agent, or Firm* — MARSHALL, GERSTEIN & BORUN LLP

(57) ABSTRACT

Actuation systems and methods are disclosed. An apparatus includes a housing, a printed circuit board, and a plurality of shape memory alloy actuators. The printed circuit board is coupled to the housing. Each shape memory alloy actuator has a pair of wire mounts, an actuator rod, a shape memory alloy wire, and a latch assembly. The pair of wire mounts are coupled to opposing sides of the printed circuit board and the actuator rod has a wire guide. The shape memory alloy wire is coupled to the wire mounts and positioned around the wire guide. The latch assembly is coupled to the printed circuit board. Applying a voltage to the shape memory alloy wire retracts the shape memory alloy wire and causes the corresponding actuator rod to move between a first position and a second position. The latch assembly is to hold the actuator rods in the second position.

22 Claims, 16 Drawing Sheets

ACTUATION SYSTEMS AND METHODS

RELATED APPLICATION

This application claims the benefit of and priority to U.S. Provisional Patent Application No. 63/469,247, filed May 26, 2023, the content of which is incorporated by reference herein in its entireties and for all purposes.

BACKGROUND

Fluidic cartridges carrying reagents and a flow cell are sometimes used in connection with fluidic systems. The fluidic cartridge may be fluidically coupled to the flow cell. The fluidic cartridges include fluidic lines through which the reagents flow to the flow cell.

SUMMARY

Shortcomings of the prior art can be overcome and advantages and benefits as described later in this disclosure can be achieved through the provision of actuation systems and methods. Various implementations of the apparatus and methods are described below, and the apparatus and methods, including and excluding the additional implementations enumerated below, in any combination (provided these combinations are not inconsistent), may overcome these shortcomings and achieve the advantages and benefits described herein.

In accordance with a first implementation, an apparatus includes a shape memory alloy actuator assembly including a housing, a printed circuit board, and a plurality of shape memory alloy actuators. The printed circuit board is coupled to the housing. Each shape memory alloy actuator has a pair of wire mounts, an actuator rod, and a shape memory alloy wire. The pair of wire mounts are coupled to opposing sides of the printed circuit board. The actuator rod has guide surfaces that define a guide slot that receives the printed circuit board and also includes a wire guide. The shape memory alloy wire is coupled to the wire mounts and positioned around the wire guide. Applying a voltage to the shape memory alloy wire retracts the shape memory alloy wire and causes the corresponding actuator rod to move between a first position and a second position. An interaction between the guide surfaces and the printed circuit board guide the movement of the corresponding actuator rod between the first position and the second position.

In accordance with a second implementation, an apparatus includes a housing, a printed circuit board, and a plurality of shape memory alloy actuators. The printed circuit board is coupled to the housing. Each shape memory alloy actuator has a pair of wire mounts, an actuator rod, a shape memory alloy wire, and a latch assembly. The pair of wire mounts are coupled to opposing sides of the printed circuit board and the actuator rod has a wire guide. The shape memory alloy wire is coupled to the wire mounts and positioned around the wire guide. The latch assembly is coupled to the printed circuit board. Applying a voltage to the shape memory alloy wire retracts the shape memory alloy wire and causes the corresponding actuator rod to move between a first position and a second position. The latch assembly is to hold the actuator rods in the second position.

In accordance with a third implementation, an apparatus includes a shape memory alloy actuator assembly including a housing, a printed circuit board, a plurality of shape memory alloy actuators. The housing has a lateral side, transverse sections extending from the lateral side, and an end plate. The printed circuit board is coupled to the transverse sections of the housing and defines latch slots. Each shape memory alloy actuator has a pair of wire mounts, an actuator rod, and a shape memory alloy wire. The pair of wire mounts are coupled to opposing sides of the printed circuit board. The actuator rod has a wire guide and a spring wire positioned in a corresponding latch slot of the printed circuit board. The shape memory alloy wire is coupled to the wire mounts and positioned around the wire guide. Applying a voltage to the shape memory alloy wire retracts the shape memory alloy wire and causes the corresponding actuator rod to move between a first position and a second position. The actuator rod moving from the first position to the second position moves the spring wire within the latch slot from a release position to a hold position where the spring wire holds the corresponding actuator rod in the second position.

In accordance with a fourth implementation, a method includes applying a voltage to a shape memory alloy wire to retract the shape memory alloy wire and cause a corresponding actuator rod to move between a first position and a second position. The method includes holding the actuator rod in the second position using a latch assembly and, in response to holding the actuator rod in the second position using the latch assembly, stopping applying the voltage to the shape memory alloy wire.

In accordance with a fifth implementation, an apparatus includes a shape memory alloy actuator assembly including an actuator rod, a shape memory alloy wire, and a latch assembly. The actuator rod has a wire guide. The shape memory alloy wire is positioned around the wire guide. Applying a voltage to the shape memory alloy wire retracts the shape memory alloy wire and causes the actuator rod to move between a first position and a second position. The latch assembly is to hold the actuator rod in the second position.

In further accordance with the foregoing first, second, third, fourth, and/or fifth implementations, an apparatus and/or method may further comprise or include any one or more of the following:

In an implementation, the guide surfaces of the actuator rods have a pair of protrusions that extend into the guide slot and interact with the printed circuit board.

In another implementation, the apparatus includes springs and the printed circuit board defines spring apertures. Each spring aperture receives one of the springs. Each actuator rod includes a spring seat that defines the guide slot and against which the corresponding spring seats.

In another implementation, the springs urge the corresponding actuator rod toward the first position.

In another implementation, the printed circuit board has a longitudinal axis and the springs have longitudinal axes. The longitudinal axes of the springs being substantially parallel to the longitudinal axis of the printed circuit board.

In another implementation, the housing has a lateral side, transverse sections extending from the lateral side, and an end plate.

In another implementation, the printed circuit board is coupled to the transverse sections of the housing.

In another implementation, the end plate defines guide apertures and each of the actuator rods have a plunger portion corresponding to one of the guide apertures.

In another implementation, the apparatus includes a plate coupled to the transverse sections of the housing. The printed circuit board and the shape memory alloy actuators are positioned between the plate and the lateral side of the housing.

In another implementation, the actuator rods include first actuator rods and second actuator rods. The apparatus includes a latch assembly coupled to the printed circuit board to hold first actuator rods in the second position.

In another implementation, the printed circuit board has a first side and a second side and the shape memory alloy wires each have a first portion on the first side of the printed circuit board and a second portion on the second side of the printed circuit board. The first portion being substantially parallel to the second portion.

In another implementation, the shape memory alloy actuators have a first shape memory alloy actuator and a second shape memory alloy actuator. The shape memory alloy wire of the first shape memory alloy actuator having a first length and the shape memory alloy wire of the second shape memory alloy actuator having a second length greater than the first length.

In another implementation, the actuator rods have a distal end defining a latch receptacle and the latch assembly has a latch for each of the actuator rods. The latches are movable between a release position and a hold position. The latches are received within the latch receptacle and hold the corresponding actuator rods in the second position when the latch assembly is in the hold position.

In another implementation, the latch assembly further includes a latch actuator to rotate the latches out of the latch receptacle and enable the latches to move from the hold position to the release position.

In another implementation, the latch actuator includes a pair of wire mounts coupled to the printed circuit board, a release bar having a first release bar portion having a wire guide, and a shape memory alloy wire coupled to the wire mounts and positioned around the wire guide of the first release bar portion. Applying a voltage to the shape memory alloy wire of the latch actuator retracts the shape memory alloy wire of the latch actuator and causes the release bar to move between a first position and a second position and causes the latches to move from the hold position to the release position.

In another implementation, the release bar has a second release bar portion having release surfaces that define apertures and each of the latches has a release protrusion. Movement of the release bar from the first position to the second position enables the release surfaces to engage the release protrusions and move the latches from the hold position to the release position.

In another implementation, the apparatus includes latch springs. Each latch has a spring protrusion that receives one of the latch springs. Each of the latch springs has an arm that engages the release protrusion of a corresponding latch to urge the latch toward the hold position.

In another implementation, the printed circuit board defines latch spring apertures and each torsion spring has an arm received in a corresponding one of the latch spring apertures.

In another implementation, the printed circuit board has a first side and a second side. The first release bar portion is on the second side of the printed circuit board and the second release bar portion is on the first side of the printed circuit board.

In another implementation, the apparatus includes a spring to urge the release bar from the second position to the first position.

In another implementation, the release bar has a spring housing in which the spring is positioned.

In another implementation, the spring comprises a compression spring.

In another implementation, the printed circuit board includes latch assembly apertures and the first release bar portion and the second release bar portion are movably coupled through the latch assembly apertures.

In another implementation, the printed circuit board has a latch aperture for each latch and each latch has a rotation protrusion that is received in the corresponding latch aperture and about which the latch rotates.

In another implementation, the apparatus includes second shape memory alloy actuators having corresponding second actuator rods that are movable between a first position and a second position. The latch assembly does not hold the second actuator rods in the second position.

In another implementation, the apparatus further includes a latch actuator to move the spring wire from the hold position to the release position.

In another implementation, the latch actuator includes: a pair of wire mounts coupled to the printed circuit board; a release bar having a wire guide; and a shape memory alloy wire coupled to the wire mounts and positioned around the wire guide of the release bar. Applying a voltage to the shape memory alloy wire of the latch actuator retracts the shape memory alloy wire of the latch actuator and causes the release bar to move between a first position and a second position and causes the spring wire to move from the hold position to the release position.

In another implementation, the latch actuator further includes an arm for each spring wire. Each of the arms has a distal end to engage the spring wire.

In another implementation, each of the arms are coupled to the release bar.

In another implementation, each of the arms has a protrusion and the release bar defines corresponding apertures that receive the protrusions to couple the arms to the release bar.

In another implementation, stopping applying the voltage to the shape memory alloy wire enables the shape memory alloy wire to cool or relax while the latch assembly holds the actuator rod in the second position.

In another implementation, the method includes moving the latch from the hold position to the release position using a latch actuator.

In another implementation, moving the latch from the hold position to the release position includes applying a voltage to a shape memory alloy wire of the latch actuator to retract the shape memory alloy wire of the latch actuator and causes a release bar of the latch actuator to move between a first position and a second position and causes the latch to move from the hold position to the release position.

In another implementation, moving the latch from the hold position to the release position using the latch actuator enables the actuator rod to move from the second position to the first position.

In another implementation, stopping applying the voltage to the shape memory alloy wire when the actuator rod is in the second position enables the shape memory alloy wire to cool or relax and substantially does not impede movement of the actuator rod from the second position to the first position.

In another implementation, the actuator rod includes a distal end defining a latch receptacle and the latch assembly comprises a latch for the actuator rod. The latch is movable between a release position and a hold position. The latch is received within the latch receptacle and holds the actuator rod in the second position when the latch assembly is in the hold position.

In another implementation, the latch assembly further comprises a latch actuator to rotate the latch out of the latch receptacle and enable the latch to move from the hold position to the release position.

In another implementation, the shape memory alloy actuator assembly comprises: a housing; a printed circuit board coupled to the housing; and a pair of wire mounts coupled to opposing sides of the printed circuit board, wherein the shape memory alloy wire is coupled to the wire mounts.

In another implementation, the apparatus includes a spring. The printed circuit board defines a spring aperture that receives the spring, wherein the spring urges the actuator rod toward the first position.

In another implementation, the actuator rod includes a spring seat that defines the guide slot and against which the spring seats.

It should be appreciated that all combinations of the foregoing concepts and additional concepts discussed in greater detail below (provided such concepts are not mutually inconsistent) are contemplated as being part of the subject matter disclosed herein and/or may be combined to achieve the particular benefits of a particular aspect. In particular, all combinations of claimed subject matter appearing at the end of this disclosure are contemplated as being part of the subject matter disclosed herein.

DETAILED DESCRIPTION

Figure 1:
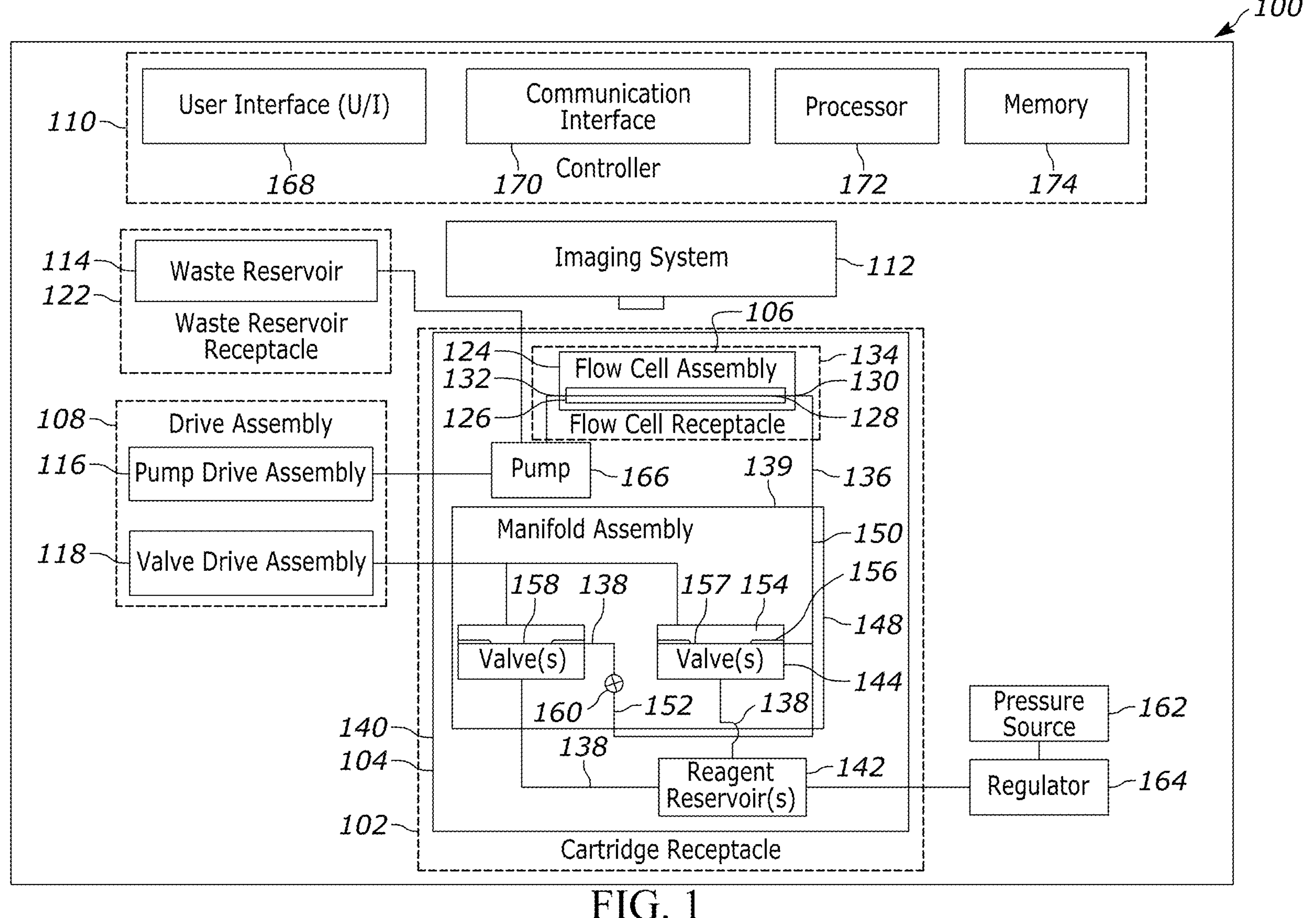
FIG. 1 illustrates a schematic diagram of an implementation of a system in accordance with the teachings of the present disclosure.

Although the following text discloses a detailed description of implementations of methods, apparatuses and/or articles of manufacture, it should be understood that the legal scope of the property right is defined by the words of the claims set forth at the end of this patent. Accordingly, the following detailed description is to be construed as examples only and does not describe every possible implementation, as describing every possible implementation would be impractical, if not impossible. Numerous alternative implementations could be implemented, using either current technology or technology developed after the filing date of this patent. It is envisioned that such alternative examples would still fall within the scope of the claims.

It may be advantageous or beneficial to have valve actuators that provide accurate and precise dispensing of small volumes of fluids (for example, liquid reagents), which in some instances may be pressurized, while maintaining a small overall footprint, including width, height, and depth.

This disclosure is directed toward valve drive assemblies of a system (for example, a sequencing system) that interfaces with a reagent cartridge and/or a flow cell assembly including membrane valves. The system includes a shape memory alloy (SMA) actuator and the membrane valves are part of a manifold assembly. The SMA actuators may be positioned very close to one another on a circuit board-10 millimeters (mm) or less spacing. The use of SMA actuators advantageously allows the membrane valves to be spaced more closely together (minimal footprint), thereby reducing an amount of dead volume within the fluidic network. For example, the SMA actuators as disclosed allow the membrane valves to be spaced in a manner that reduces dead volume between the reagent fluidic lines and a common fluidic line. Less consumables such as reagents may be used as a result. Moreover, by spacing the membranes valves closer together, a length of a common reagent line may be reduced, thereby shortening cycle times and run times of instruments/systems implementing the disclosed examples.

The SMA actuators include a plunger, a spring that biases the plunger, and a SMA wire in some implementations. A latch assembly may also be included to hold the plunger in the retracted position without the SMA wire being energized. The latch assembly allows the plunger to be held in the retracted position for a threshold period of time that may be greater than a period of time recommended for the SMA wire to be energized.

The SMA wires may be deenergized after the latch assembly holds the associated plunger in the retracted position. The SMA wires may cool or relax when not being energized. The SMA wire being cooled and/or relaxed reduces or removes any opposition force applied to the associated plunger by the SMA wire. The plunger can thus move from the retracted to the extended position more quickly when the latch assembly is released because the SMA wire is already cooled or relaxed. The plunger moving faster between positions allows corresponding valves to be actuated faster. The latch assemblies may also increase the useful life of the SMA wires because the SMA wires may not be energized when the corresponding latch assemblies hold the plunger in the retracted position. The disclosed latch assemblies may increase the speed at which SMA valves are actuatable and/or increase the useful of such SMA actuators.

FIG. 1 illustrates a schematic diagram of an implementation of a system 100 in accordance with the teachings of the present disclosure. The system 100 can be used to perform an analysis on one or more samples of interest. The sample may include one or more DNA clusters that are linearized to form a single stranded DNA (sstDNA). In the implementation shown, the system 100 includes a reagent cartridge receptacle 102 that can receive a reagent cartridge 104. The reagent cartridge 104 carries a flow cell assembly 106.

The system 100 includes, in part, a drive assembly 108, a controller 110, an imaging system 112, and a waste reservoir 114 in the implementation shown. The drive assembly 108 includes a pump drive assembly 116 and a valve drive assembly 118.

Referring back to the controller 110, in the implementation shown, the controller 110 is electrically and/or communicatively coupled to the drive assembly 108 and the imaging system 112 and can cause the drive assembly 108 and/or the imaging system 112 to perform various functions as disclosed herein. The waste reservoir 114 may be selectively receivable within a waste reservoir receptacle 122 of the system 100. In other implementations, the waste reservoir 114 may be included in the reagent cartridge 104.

The reagent cartridge 104 may carry one or more samples of interest. The drive assembly 108 interfaces with the reagent cartridge 104 to flow one or more reagents (e.g., A, T, G, C nucleotides) that interact with the sample through the reagent cartridge 104 and/or through the flow cell assembly 106.

In an implementation, a reversible terminator is attached to the reagent to allow a single nucleotide to be incorporated by the sstDNA per cycle. In some such implementations, one or more of the nucleotides has a unique fluorescent label that emits a color when excited. The color (or absence thereof) is used to detect the corresponding nucleotide. The imaging system 112 can excite one or more of the identifiable labels (e.g., a fluorescent label) and thereafter obtain image data for the identifiable labels in the implementation shown. The labels may be excited by incident light and/or a laser and the image data may include one or more colors emitted by the respective labels in response to the excitation. The image data (e.g., detection data) may be analyzed by the system 100. The imaging system 112 may be a fluorescence spectrophotometer including an objective lens and/or a solid-state imaging device. The solid-state imaging device may include a charge coupled device (CCD) and/or a complementary metal oxide semiconductor (CMOS).

After the image data is obtained, the drive assembly 108 interfaces with the reagent cartridge 104 to flow another reaction component (e.g., a reagent) through the reagent cartridge 104 that is thereafter received by the waste reservoir 114 and/or otherwise exhausted by the reagent cartridge 104. The reaction component performs a flushing operation that chemically cleaves the fluorescent label and the reversible terminator from the sstDNA. The sstDNA is then ready for another cycle.

The flow cell assembly 106 includes a housing 124 and a flow cell 126. As used herein, a "flow cell" can include a device having a lid extending over a reaction structure to form a flow channel there between that is in communication with a plurality of reaction sites of the reaction structure, and can include a detection device that detects designated reactions that occur at or proximate to the reaction sites. The flow cell 126 includes at least one channel 128, a flow cell inlet 130, and a flow cell outlet 132. The channel 128 may be U-shaped or may be straight and extend across the flow cell 126. Other configurations of the channel 128 may prove suitable. Each of the channels 128 may have a dedicated flow cell inlet 130 and a dedicated flow cell outlet 132. A single flow cell inlet 130 may alternatively be fluidly coupled to more than one channel 128 via, for example, an inlet manifold. A single flow cell outlet 132 may alternatively be coupled to more than one channel via, for example, an outlet manifold. In an implementation, the flow cell assembly 106 may be formed by a plurality of layers such as, for example, laminate layers. The flow cell 126 and/or the channel 128 may include one or more microstructures or nanostructures in such an implementation. The microstructures may be formed using a nanoimprint lithography pattern or embossing. Other manufacturing techniques may prove suitable. The nanostructures may include wells, pillars, electrodes, gratings, etc.

In the implementation shown, the reagent cartridge 104 includes a flow cell receptacle 134, a common fluidic line 136, a plurality of reagent fluidic lines 138, and a manifold assembly 139. In other implementations, the manifold assembly 139 is part of the flow cell assembly 106 and/or part of the system 100. The reagent cartridge 104 includes a reagent cartridge body 140.

The flow cell receptacle 134 can receive the flow cell assembly 106. The flow cell assembly 106 can alternatively be integrated into the reagent cartridge 104. In such implementations, the flow cell receptacle 134 may not be included or, at least, the flow cell assembly 106 may not be removably receivable within the reagent cartridge 104. The flow cell assembly 106 may in some implementations be separate from the reagent cartridge 104 and receivable in the flow cell receptacle 134 of the system 100.

Each of the reagent fluidic lines 138 can be coupled to a corresponding reagent reservoir 142 that may contain fluid (e.g., reagent and/or another reaction component). The reagent cartridge body 140 may be formed of solid plastic using injection molding techniques and/or additive manufacturing techniques. The reagent reservoirs 142 are integrally formed with the reagent cartridge body 140 in some implementations. The reagent reservoirs 142 are separately formed and are coupled to the reagent cartridge body 140 in other implementations.

In the implementation shown, the manifold assembly 139 includes a plurality of membrane valves 144. The membrane valves 144 may be rod-flap valves or volcano valves. The manifold assembly 139 fluidically couples the common fluidic line 136 and each of the reagent fluidic lines 138. Each membrane valve 144 is coupled between the common fluidic line 136 and a corresponding reagent fluidic line 138.

The valve drive assembly 118 interfaces with the membrane valves 144 in operation to control a flow of reagent between the reagent fluidic lines 138 and the common fluidic line 136. In some implementations and as further disclosed below, the valve drive assembly 118 includes a plurality of shape memory alloy actuators that are selectively actuatable to control a position of the corresponding membrane valves 144. Shape memory alloy actuators are moved between a first position and a second position (actuated) by applying a voltage to a shape memory alloy wire, which causes the temperature of the wire to increase and for the wire to contract. When the voltage is no longer applied to the wire, the temperature of the wire decreases and the wire relaxes.

Referring now to the manifold assembly 139, in the implementation shown, the manifold assembly 139 includes a manifold body 148 that may be formed of polypropylene, a cyclic olefin copolymer, a cyclo olefin polymer, and/or other polymers. The manifold body 148 defines a portion 150 of the common fluidic line 136 and a portion 152 of the reagent fluidic lines 138. A membrane 154 is coupled to portions 156 of the manifold body 148 while another portion 157 of the membrane 154 is not coupled to the manifold body 148. The membrane 154 may thus be locally bonded to the manifold body 148 while the portion 157 above a valve seat 158 of the manifold body 148 is not being bonded to the membrane 154 to allow for a fluidic passage to be created. The membrane 154 may be formed of a flat sheet. The membrane 154 may be elastomeric.

The membrane valves 144 are formed by the membrane 154 and the manifold body 148 in the implementation shown. The manifold body 148 includes the valve seat 158 disposed between the portions 156 of the manifold body 148 and the valve seat 158 is not coupled to the membrane 154. The membrane 154 may thus move away from the valve seat 158 to allow fluid to flow across the corresponding membrane valve 144.

To close the membrane valves 144, the valve drive assembly 118 interfaces with the membrane 154 and drives the membrane 154 against the valve seat 158. The valve drive assembly 118 may allow the membrane 154 to move away from the valve seat 158 to open the membrane valves 144. In an implementation where the valve drive assembly 118 includes a plurality of plungers, the plungers may selectively move away from the valve seat 158 to allow the membrane 154 to move away from the valve seat 158. In another implementation, the valve drive assembly 118 includes plungers that are coupled to the membrane 154. The coupling between the plungers and the membrane 154 may be a snap fit connection or a magnetic connection. Other types of couplings may prove suitable. For example, the valve drive assembly 118 may be mechanically linked to the membrane 154.

The manifold assembly 139 includes a shut-off valve 160 in the implementation shown that may interface with the valve drive assembly 118 and may further control the flow between at least one of the reagent fluidic lines 138 and the common fluidic line 136. The shut-off valve 160 may be actuated to the closed position after processes using reagent from a corresponding reagent reservoir 142 are complete, for example. The shut-off valve 160 may be positioned upstream or downstream of a respective membrane valve 144. Such an approach may further deter cross-contamination from occurring between the different reagents. Because there is a reduced likelihood of cross-contamination, less wash buffer may be used.

The system 100 includes a pressure source 162 that may, in some implementations, be used to pressurize the reagent cartridge 104. The reagent, under pressure via the pressure source 162, may be urged through the manifold assembly 139 and toward the flow cell assembly 106. The pressure source 162 may be carried by the reagent cartridge 104 in another implementation. A regulator 164 is positioned between the pressure source 162 and the manifold assembly 139 and regulates a pressure of the gas provided to the manifold assembly 139. The gas may be air, nitrogen, and/or argon. Other gases may prove suitable. Alternatively, the regulator 164 and/or pressure source 162 may not be included.

Referring now to the drive assembly 108, in the implementation shown, the drive assembly 108 includes the pump drive assembly 116 and the valve drive assembly 118. The pump drive assembly 116 can interface with one or more pumps 166 to pump fluid through the reagent cartridge 104. The pump 166 may be implemented by a syringe pump, a peristaltic pump, a diaphragm pump, etc. While the pump 166 may be positioned between the flow cell assembly 106 and the waste reservoir 114, the pump 166 may be positioned upstream of the flow cell assembly 106 or omitted entirely in other implementations.

Referring to the controller 110, in the implementation shown, the controller 110 includes a user interface 168, a communication interface 170, one or more processors 172, and a memory 174 storing instructions executable by the one or more processors 172 to perform various functions including the disclosed implementation. The user interface 168, the communication interface 170, and the memory 174 are electrically and/or communicatively coupled to the one or more processors 172.

In an implementation, the user interface 168 can receive input from a user and to provide information to the user associated with the operation of the system 100 and/or an analysis taking place. The user interface 168 may include a touch screen, a display, a key board, a speaker(s), a mouse, a track ball, and/or a voice recognition system. The touch screen and/or the display may display a graphical user interface (GUI).

In an implementation, the communication interface 170 can enable communication between the system 100 and a remote system(s) (e.g., computers) via a network(s). The network(s) may include the Internet, an intranet, a local-area network (LAN), a wide-area network (WAN), a coaxial-cable network, a wireless network, a wired network, a satellite network, a digital subscriber line (DSL) network, a cellular network, a Bluetooth connection, a near field communication (NFC) connection, etc. Some of the communications provided to the remote system may be associated with analysis results, imaging data, etc. generated or otherwise obtained by the system 100. Some of the communications provided to the system 100 may be associated with a fluidics analysis operation, patient records, and/or a protocol(s) to be executed by the system 100.

The one or more processors 172 and/or the system 100 may include one or more of a processor-based system(s) or a microprocessor-based system(s). In some implementations, the one or more processors 172 and/or the system 100 includes one or more of a programmable processor, a programmable controller, a microprocessor, a microcontroller, a graphics processing unit (GPU), a digital signal processor (DSP), a reduced-instruction set computer (RISC), an application specific integrated circuit (ASIC), a field programmable gate array (FPGA), a field programmable logic device (FPLD), a logic circuit, and/or another logic-based device executing various functions including the ones described herein.

The memory 174 can include one or more of a semiconductor memory, a magnetically readable memory, an optical memory, a hard disk drive (HDD), an optical storage drive, a solid-state storage device, a solid-state drive (SSD), a flash memory, a read-only memory (ROM), erasable programmable read-only memory (EPROM), electrically erasable programmable read-only memory (EEPROM), a random-access memory (RAM), a non-volatile RAM (NVRAM) memory, a compact disc (CD), a compact disc read-only memory (CD-ROM), a digital versatile disk (DVD), a Blu-ray disk, a redundant array of independent disks (RAID) system, a cache, and/or any other storage device or storage disk in which information is stored for any duration (e.g., permanently, temporarily, for extended periods of time, for buffering, for caching).

Figure 2:
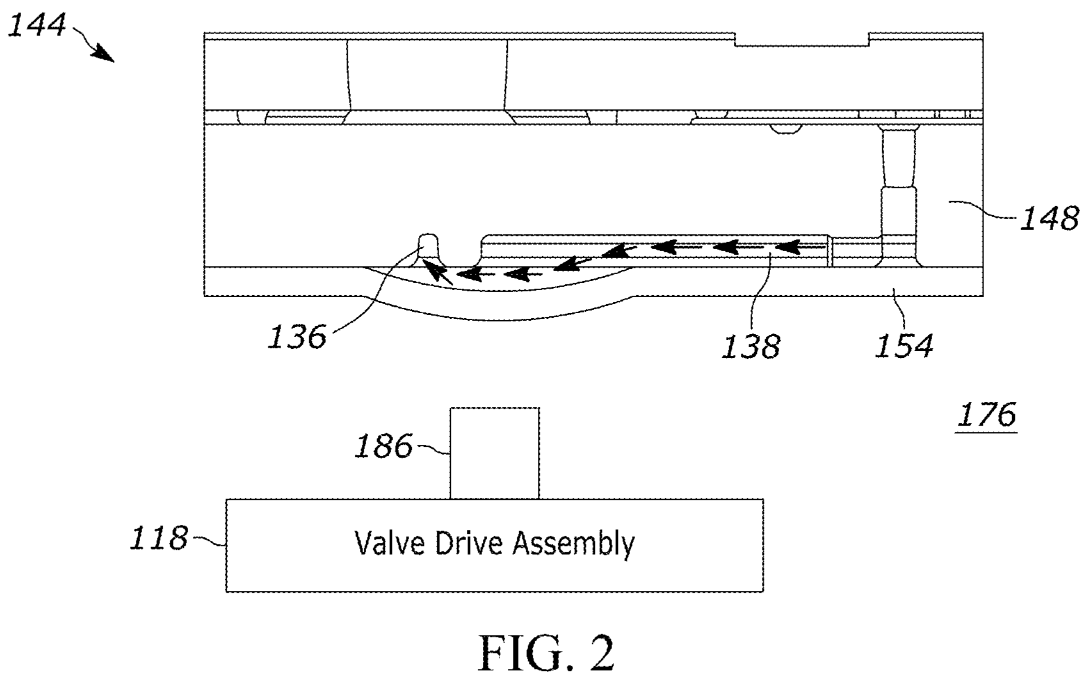
FIG. 2 is a cross-sectional view of an implementation of a manifold assembly including a membrane valve in the open position and the valve drive assembly of FIG. 1 spaced from a membrane of the membrane valve.

FIG. 2 is a cross-sectional view of an implementation of the manifold assembly 139 including the membrane valve 144 in the open position and the valve drive assembly 118 of FIG. 1 spaced from the membrane 154 of the membrane valve 144.

Figure 3:
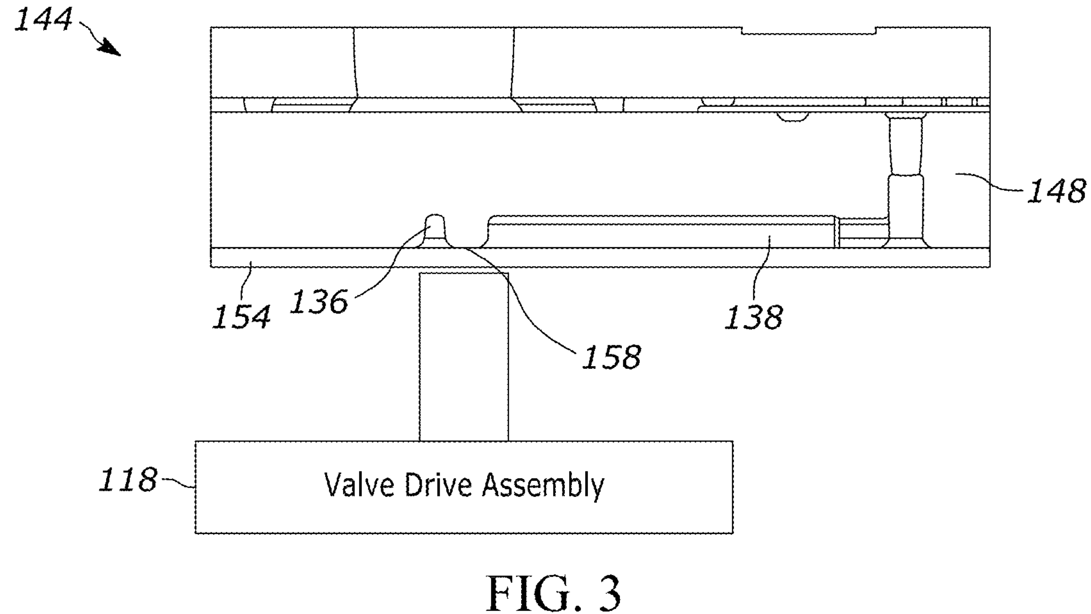
FIG. 3 is a cross-sectional view of an implementation of a manifold assembly including a membrane valve in the closed position and the valve drive assembly of FIG. 1 urging a membrane of the membrane valve into engagement with a valve seat.

FIG. 3 is a cross-sectional view of an implementation of the manifold assembly 139 including the membrane valve 144 in the closed position and the valve drive assembly 118 of FIG. 1 urging the membrane 154 of the membrane valve 144 into engagement with the valve seat 158.

Figure 4:
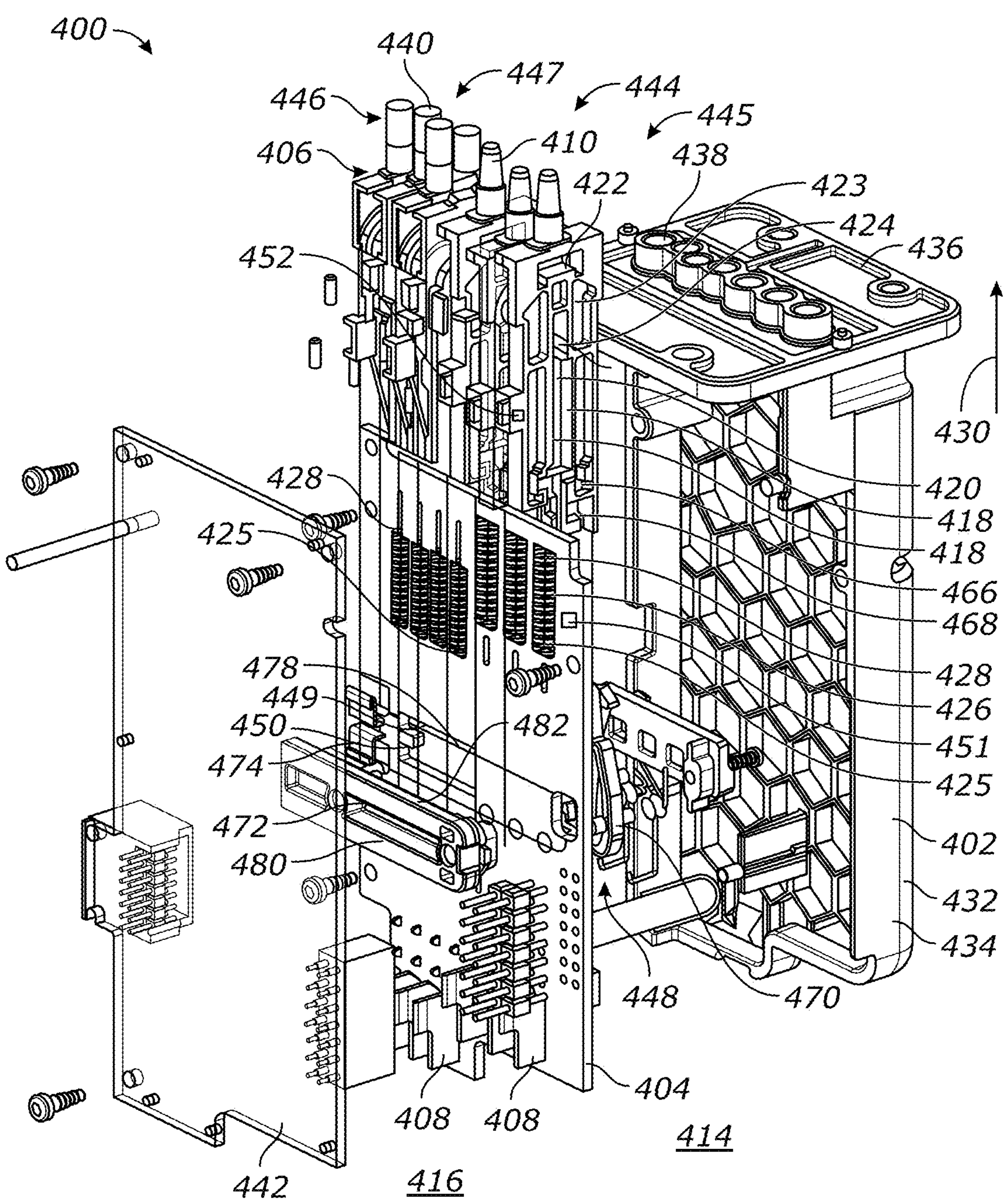
FIG. 4 is an expanded view of an example shape memory alloy actuator assembly that can be used to implement the valve drive assembly of FIG. 1.

FIG. 4 is an expanded view of an example shape memory alloy actuator assembly 400 that can be used to implement the valve drive assembly 118 of FIG. 1. The shape memory alloy actuator assembly 400 includes a housing 402, a printed circuit board 404, and plurality of shape memory alloy actuators 406. The printed circuit board 404 is coupled to the housing 402 and each shape memory alloy actuator 406 has a pair of wire mounts 408, an actuator rod 410, and a shape memory alloy wire 412. The wire mounts 408 are coupled to opposing sides 414, 416 of the printed circuit board 404.

The actuator rod 410 has guide surfaces 418 that define a guide slot 420 that receives the printed circuit board 404 and the actuator rod 410 also includes a wire guide 422. The actuator rod 410 includes a U-shaped portion 423 that defines the guide slot 420. The printed circuit board 404 is positioned within the guide slot 420. The shape memory alloy wire 412 is coupled to the wire mounts 408 and positioned around the wire guide 422.

A voltage is applied to the shape memory alloy wire 412 in operation and causes the shape memory alloy wire 412 to retract the shape memory alloy wire 412 and cause the corresponding actuator rod 410 to move between a first position and a second position. The guide surfaces 418 and the printed circuit board 404 interact and guide the movement of the corresponding actuator rod 410 between the first position and the second position. The guide surfaces 418 of the actuator rods 410 includes a pair of protrusions 424 (more clearly shown in FIGS. 11-13) in the implementation shown that extends into the guide slot 420 and interact with the printed circuit board 404. The guide surfaces 418 may include two pairs of protrusion 424 as an example. The protrusions 424 may provide increased gap control and/or increase tolerances.

The shape memory alloy actuator assembly 400 also includes springs 425 and the printed circuit board 404 defines spring apertures 426 that each receive one of the springs 425. Each actuator rod 410 also includes a spring seat 428 that defines the guide slot 420 and against which the corresponding spring 425 seats. The springs 425 urge the corresponding actuator rod 410 toward the first position and in a direction generally indicated by arrow 430.

The printed circuit board 404 has a longitudinal axis and the springs 425 have longitudinal axes that are substantially parallel to the longitudinal axis of the printed circuit board 404 in the implementation shown. The phrase "substantially parallel" as set forth herein means about +/−5 of parallel and/or accounts for manufacturing tolerances.

The housing 402 includes a lateral side 432, transverse sections 434 extending from the lateral side 432, and an end plate 436. The printed circuit board 404 is coupled to the transverse sections 434 of the housing 402. The end plate 436 defines guide apertures 438 and each of the actuator rods 410 have a plunger portion 440 corresponding to one of the guide apertures 438.

The shape memory alloy actuator assembly 400 also includes a plate 442 in the implementation shown that is coupled to the transverse sections 434 of the housing 402. The printed circuit board 404 and the shape memory alloy actuators 406 are positioned between the plate 442 and the lateral side 432 of the housing 402.

The actuator rods 410 include first actuator rods 444 associated with first shape memory alloy actuators 445 and second actuator rods 446 associated with second shape memory alloy actuators 447 in the implementation shown. The first actuator rods 444 may have a stroke of between about 1.0 millimeter (mm) and about 2.00 mm and/or between about 1.35 mm and about 1.9 mm. The second actuator rods 446 may have a stroke of between about 0.8 mm and about 1.4 mm and/or between about 1.00 mm and about 1.162 mm. The actuator rods 444 and/or 446 may have any stroke length including the same stroke length, however.

The shape memory alloy actuator assembly 400 also includes a latch assembly 448 in the implementation shown. The latch assembly 448 is coupled to the printed circuit board 404 and is used to hold the first actuator rods 444 in the second position. The latch assembly 448 is also actuatable to release the first actuator rods 444 from being held in the second position and allow the corresponding springs 425 to move the first actuator rods 444 from the second position to the first position. The latch assembly 448 does not hold the second actuator rods 446 in the second position. The latch assembly 448 may be structured to hold the second actuator rods 446 in the second position in other implementations, however.

The printed circuit board 404 defines a latch assembly spring aperture 449 and has a spring seat 450 that extends into the latch assembly spring aperture 449. A spring 506 (see. 8) may be received within the latch assembly spring aperture 449 and surround and seat against the spring seat 450. The spring may bias the latch assembly 448.

Voltage may not be applied to the shape memory alloy wires 412 when the first actuator rods 444 are in the second position and being held in the second position by the latch assembly 448. The shape memory alloy wires 412 may cool or relax when voltage is not being applied to them. The shape memory alloy wires 412 may not exert a force on to the first actuator rods 444 in a direction opposite the direction of the arrow 430 when the shape memory alloy wires 412 are cooled and/or relaxed. The first actuator rods 444 may move more quickly from the second position to the first position in the direction generally indicated by arrow 430 when the latch assembly 448 releases the first actuator rods 444 because volage is not applied to the shape memory alloy wires 412 when the first actuator rods 444 are in the second position.

The shape memory alloy actuator assembly 400 also includes sensors 451 and targets 452 that are used to determine a location of the corresponding shape memory alloy actuators 406. The shape memory alloy actuator assembly 400 or the corresponding instrument may stop applying voltage to the shape memory alloy wire 412 and/or reduce the voltage applied to the shape memory alloy wire 412 in response to the actuator rod 410 being in a desired position such as the second position. One of the sensors 451 or the target 452 may be carried by the actuator rod 410 and the housing 402 may carry the other of the sensor 451 or the target 452.

Figure 5:
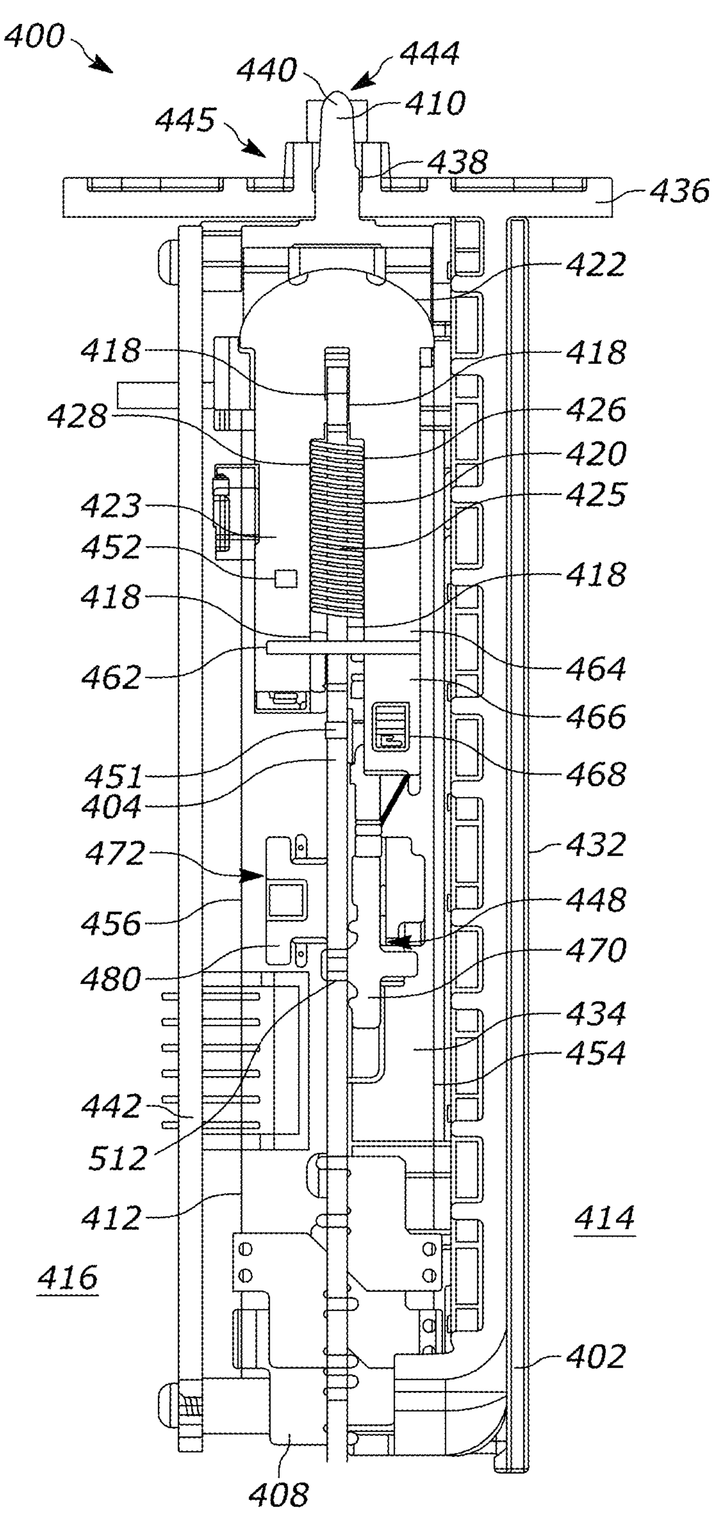
FIG. 5 is a cross-sectional view of the shape memory alloy actuator assembly of FIG. 4 showing one of the first actuator rods and the latch assembly.

FIG. 5 is a cross-sectional view of the shape memory alloy actuator assembly 400 of FIG. 4 showing one of the first actuator rods 444 and the latch assembly 448. The shape memory alloy wires 412 are shown each have a first portion 454 on the first side 414 of the printed circuit board 404 and a second portion 456 on the second side 416 of the printed circuit board 404, where the first portion 454 is substantially parallel to the second portion 456. The first portion 454 and the second portion 456 of the shape memory alloy wires 412 may be at a different angle other than parallel, however. The first portion 454 and the second portion 456 of the shape memory alloy wires 412 may be an angle greater than 0 such as 45°, for example.

Figure 6:
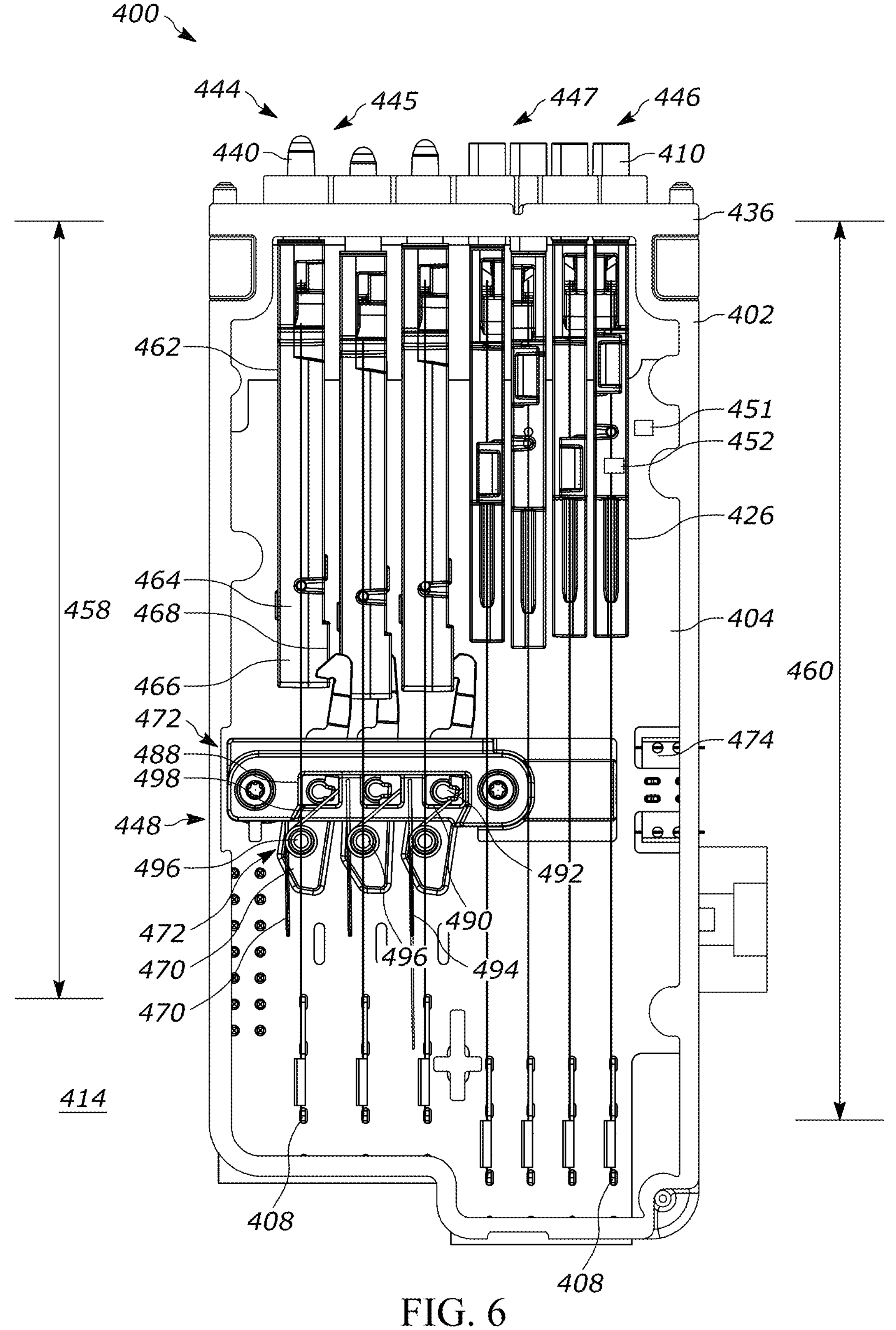
FIG. 6 is a plan view of the shape memory alloy actuator assembly of FIG. 4 showing the first side of the printed circuit board and the first shape memory alloy actuators and the second shape memory alloy actuators.

FIG. 6 is a plan view of the shape memory alloy actuator assembly 400 of FIG. 4 showing the first side 414 of the printed circuit board 404 and the first shape memory alloy actuators 445 and the second shape memory alloy actuators 447. The shape memory alloy wires 412 of the first shape memory alloy actuator 445 have a first length 458 in the implementation shown and the shape memory alloy wire 412 of the second shape memory alloy actuators 447 have a second length 460 that is greater than the first length 458. The length of the shape memory alloy wire 412 may be associated with its useful life. A longer shape memory alloy wire 412 may have a longer useful life than a shorter shape memory alloy wire 412.

The U-shaped portion 423 of the actuator rods 410, 444 include a first leg 462 (more clearly shown in FIG. 5) and a second leg 464. The second leg 464 of the actuator rods 444 have a distal end 466 defining a latch receptacle 468 and the latch assembly 448 has a latch 470 for each of the actuator rods 444. The latches 470 are movable between a release position and a hold position. The latches 470 are received within the latch receptacle 468 of the corresponding first actuator rods 444 and hold the first actuator rod 444 in the second position when the latch assembly 448 is in the hold position.

Figure 7:
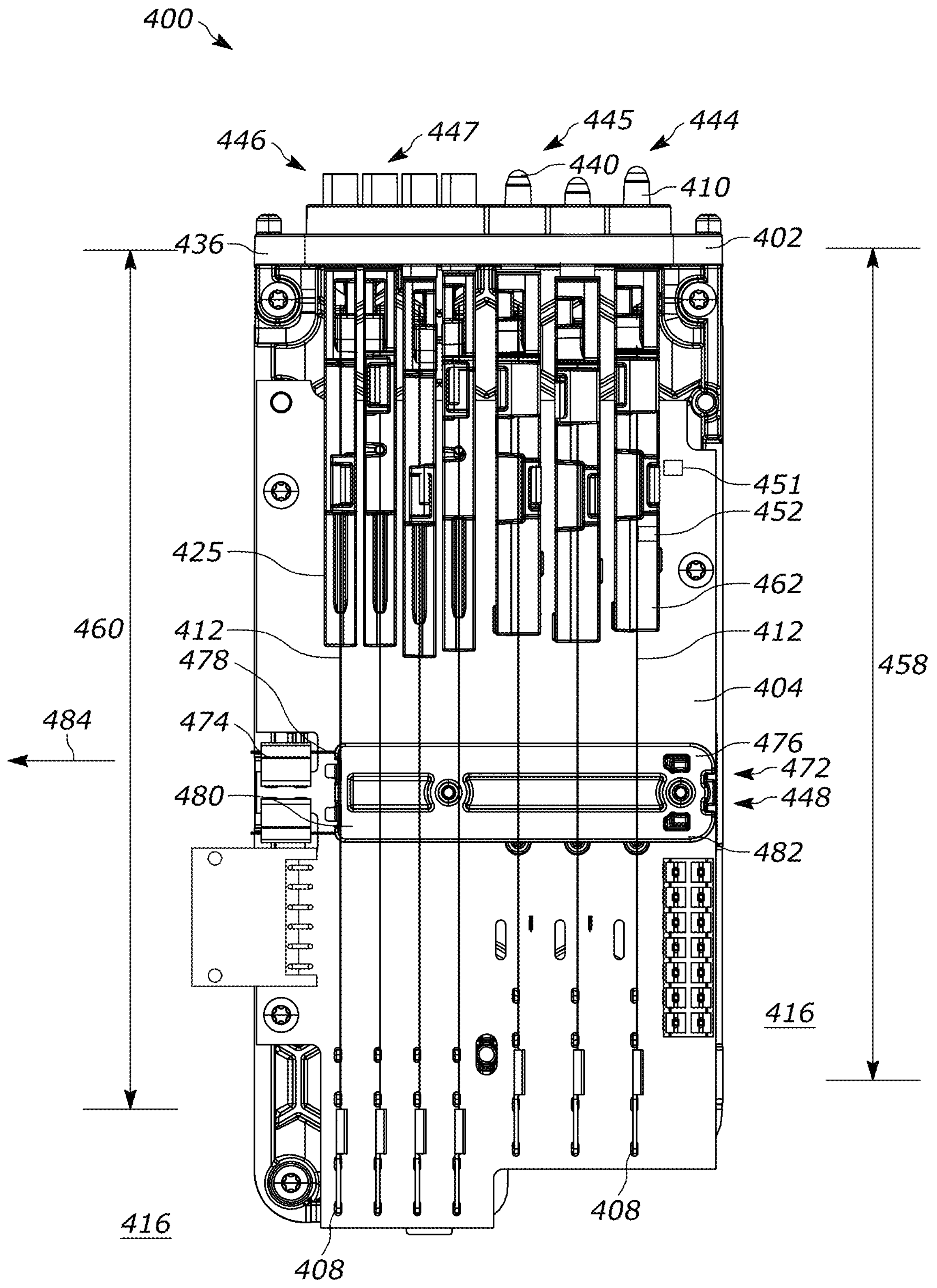
FIG. 7 is a plan view of the shape memory alloy actuator assembly of FIG. 4 showing the second side of the printed circuit board and the first shape memory alloy actuators and the second shape memory alloy actuators.

FIG. 7 is a plan view of the shape memory alloy actuator assembly 400 of FIG. 4 showing the second side 416 of the printed circuit board 404 and the first shape memory alloy actuators 445 and the second shape memory alloy actuators 447. The latch assembly 448 is shown including a latch actuator 472 in the implementation shown. The latch actuator 472 rotates the latches 470 out of the corresponding latch receptacle 468 and enables the latch 470 to move from the hold position to the release position. The latch actuator 472 has a pair of wire mounts 474, a release bar 476, and a shape memory alloy wire 478 in the implementation shown. The pair of wire mounts 474 are coupled to the printed circuit board 404 and the release bar 476 has a first release bar portion 480 having a wire guide 482. The shape memory alloy wire 478 is coupled to the wire mounts 474 and positioned around the wire guide 482 of the release bar 476. A voltage is applied to the shape memory alloy wire 478 of the latch actuator 472 in operation to retract the shape memory alloy wire 478 of the latch actuator 472 and cause the release bar 476 to move between a first position and a second position in a direction generally indicated by arrow 484 and cause the latch 470 to move from the hold position to the release position.

Figure 8:
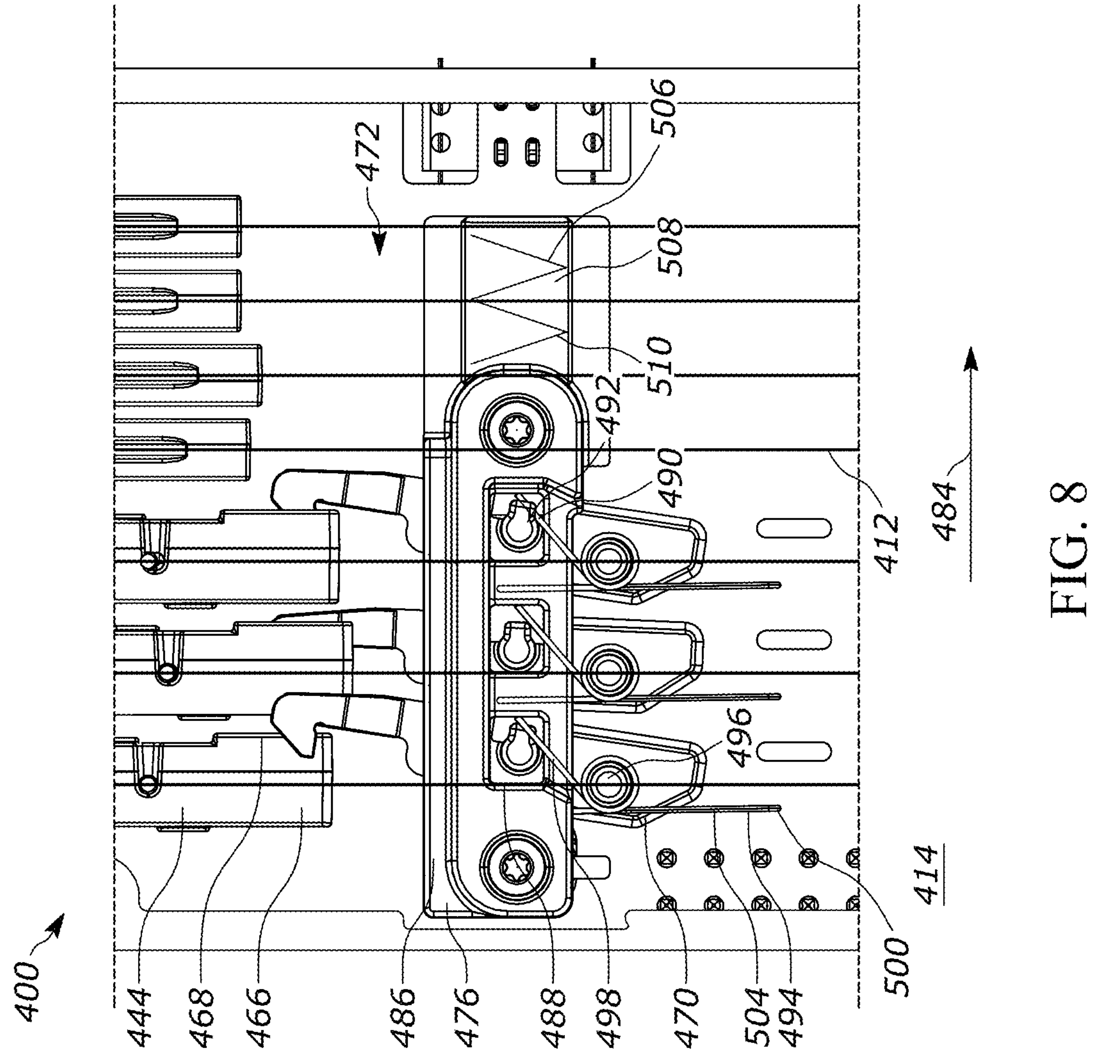
FIG. 8 is a detailed plan view of the shape memory alloy actuator assembly of FIG. 4 showing the first side of the printed circuit board, the second shape memory alloy actuators, and the latch actuator.

FIG. 8 is a detailed plan view of the shape memory alloy actuator assembly 400 of FIG. 4 showing the first side 414 of the printed circuit board 404, the second shape memory alloy actuators 447, and the latch actuator 472. The release bar 476 has a second release bar portion 486 in the implementation shown. The first release bar portion 480 is positioned on the second side 416 of the printed circuit board 404 and the second release bar portion 486 is positioned on the first side 414 of the printed circuit board 404. The second release bar portion 486 has release surfaces 488 that define apertures 490 and each of the latches 470 has a release protrusion 492. The release bar 476 moving from the first position to the second position in the direction of the arrow 484 enables the release surfaces 488 to engage the corresponding release protrusion 492 and move the latches 470 from the hold position to the release position. The first actuator rods 444 are urged by the springs 425 to move from the second position toward the first position after the latch assembly 448 is in the release position.

The shape memory alloy actuator assembly 400 also includes latch springs 494 and each latch 470 has a spring protrusion 496 that receives one of the latch springs 494 in the implementation shown. Each latch spring 494 has an arm 498 that engages the release protrusion 492 of a corresponding latch 470 to urge the latch 470 toward the hold position. The printed circuit board 404 defines latch spring apertures 500 and the latch springs 494 are torsion springs 502. Each latch spring 494 has an arm 504 received in a corresponding one of the latch spring apertures 500. The interaction between the arms 498, 504 of the latch spring 494 and the release protrusion 492 and the printed circuit board 404 urge the latches 470 to rotate counterclockwise in the implementation shown and into the hold position.

A spring 506 is included to urge the release bar 476 from the second position to the first position and in the direction generally opposite that indicated by arrow 484. The release bar 476 has a spring housing 508 in which the spring 506 is positioned. The spring 506 may be positioned within the latch assembly spring aperture 449 (more clearly shown in FIG. 4) of the printed circuit board 404 and the first release bar portion 480 and the second release bar portion 486 may include a portion of the spring housing 508 in which the spring 506 partially extends. The spring 506 is shown being a compression spring 510. The spring 506 may be implemented by any other biasing element, however. The spring 506 may be implemented by Belleville washers as an example.

Figure 9:
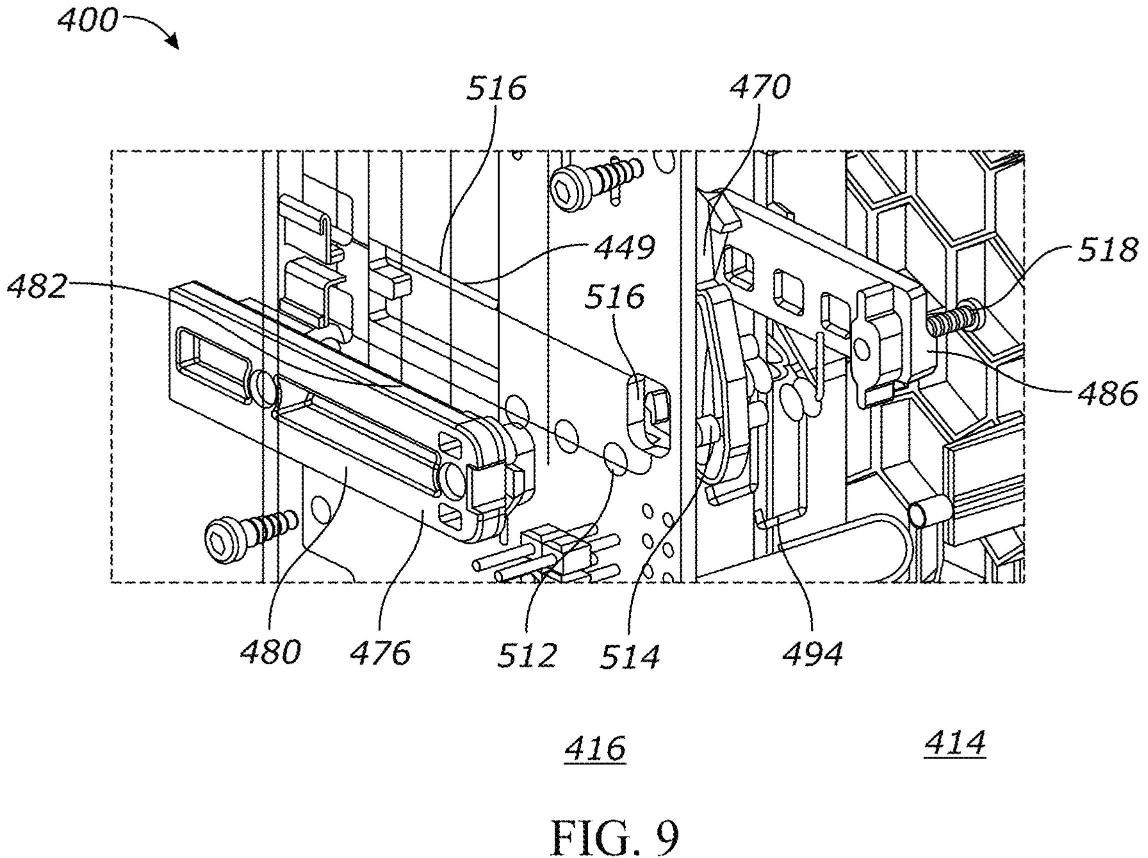
FIG. 9 is a detailed isomeric expanded view of the shape memory alloy actuator assembly of FIG. 4.

FIG. 9 is a detailed isomeric expanded view of the shape memory alloy actuator assembly 400 of FIG. 4. The first release bar portion 480 is shown being on the second side 416 of the printed circuit board 404 and the second release bar portion 486 is shown being on the first side 414 of the printed circuit board 404. The printed circuit board 404 has a latch aperture 512 for each latch 470 and each latch 470 has a rotation protrusion 514 that is received in the latch aperture 512 and about which the corresponding latch 470 rotates. The latches 470 are positioned between the printed circuit board 404 and the second release bar portion 486 in the implementation shown. The printed circuit board 404 has latch assembly apertures 516 and the first release bar portion 480 and the second release bar portion 486 are movably coupled through the latch assembly apertures 516. One of the latch assembly apertures 516 is the latch spring aperture 449 that receives a spring to bias the release bar 476 in the implementation shown. Fasteners 518 may be used to couple the release bar portions 480, 486 together.

Figure 10:
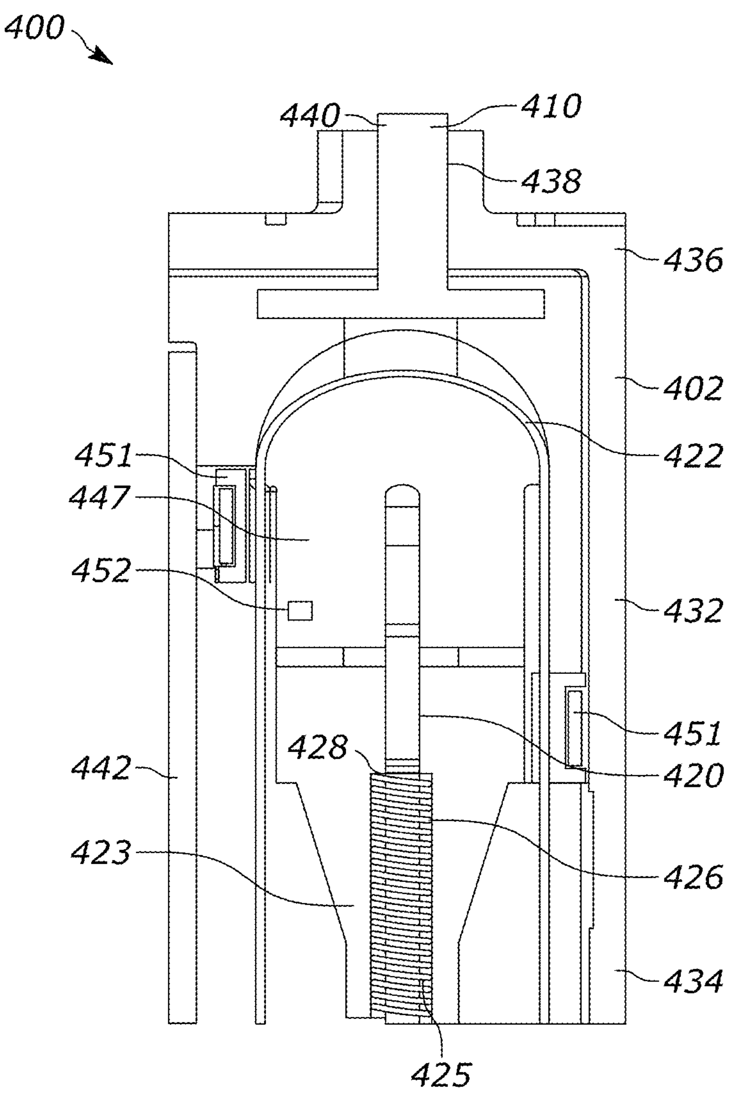
FIG. 10 is a detailed cross-sectional view of the shape memory alloy actuator assembly of FIG. 4 showing one of the second shape memory alloy actuators.

FIG. 10 is a detailed cross-sectional view of the shape memory alloy actuator assembly 400 of FIG. 4 showing one of the second shape memory alloy actuators 447. The housing 402 and the plate 442 are shown carrying sensors 451 and the second actuator rod 446 is shown carrying the target 452. The sensor 451 carried by the plate 442 may be associated with the second actuator rod 446 being in the first position and the sensor 451 carried by the housing 402 may be associated with the second actuator rod 446 being in the second position.

Figure 11:
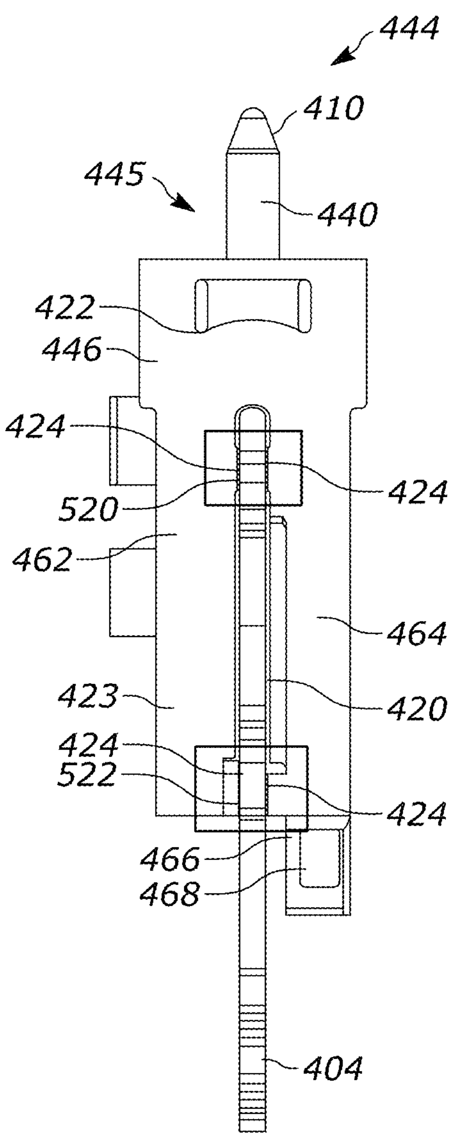
FIG. 11 is a cross-sectional view of the printed circuit board of the shape memory alloy actuator assembly of FIG. 4 and a side view of one of the first actuator rods of the shape memory alloy actuator assembly of FIG. 4.

FIG. 11 is a cross-sectional view of the printed circuit board 404 of the shape memory alloy actuator assembly 400 of FIG. 4 and a side view of one of the second actuator rods 446 of the shape memory alloy actuator assembly 400 of FIG. 4. The guide surfaces 418 are shown including a first pair 520 of the guide protrusions 424 and a second pair 522 of the guide protrusions 424. The guide protrusions 424 may be implemented by flat surfaces that extend into the guide slot 420 and reduce tolerances between the first actuator rod 444 and the printed circuit board 404. The second actuator rods 446 may also include guide protrusions 424. The guide surfaces 418 may reduce free play of the actuator rod 410 during z-axis actuation that may improve linear accuracy and test repeatability.

Figure 12:
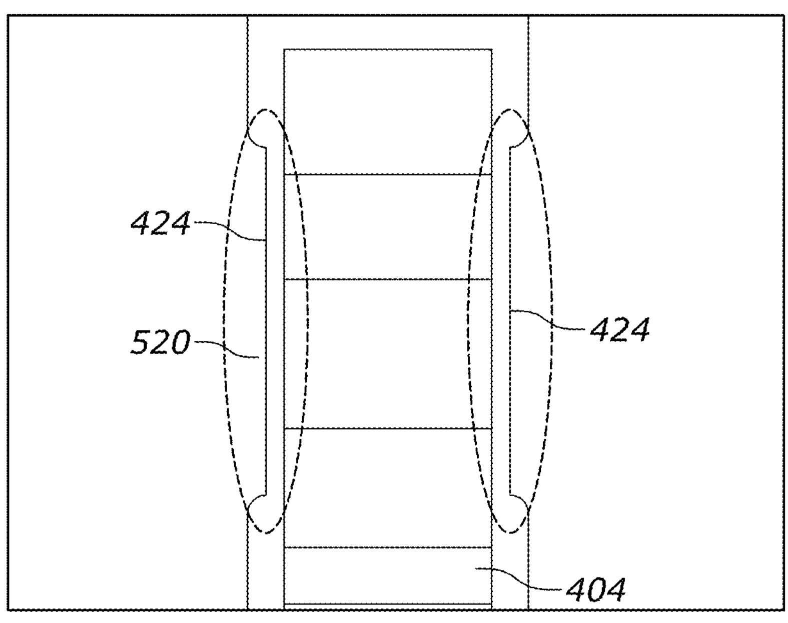
FIG. 12 is a detailed view of a first pair of guide protrusions of the first actuator rod and the printed circuit board of FIG. 11.

FIG. 12 is a detailed view of the first pair 520 of the guide protrusions 424 and the printed circuit board 404 of FIG. 11.

Figure 13:
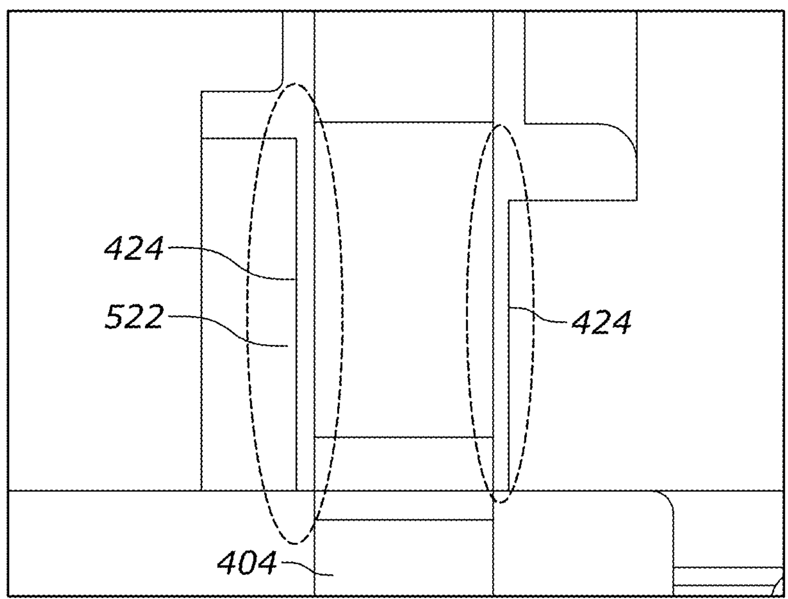
FIG. 13 is a detailed view of a second pair of guide protrusions of the first actuator rod and the printed circuit board of FIG. 11.

FIG. 13 is a detailed view of the second pair 522 of the guide protrusions 424 and the printed circuit board 404 of FIG. 11.

Figure 14:
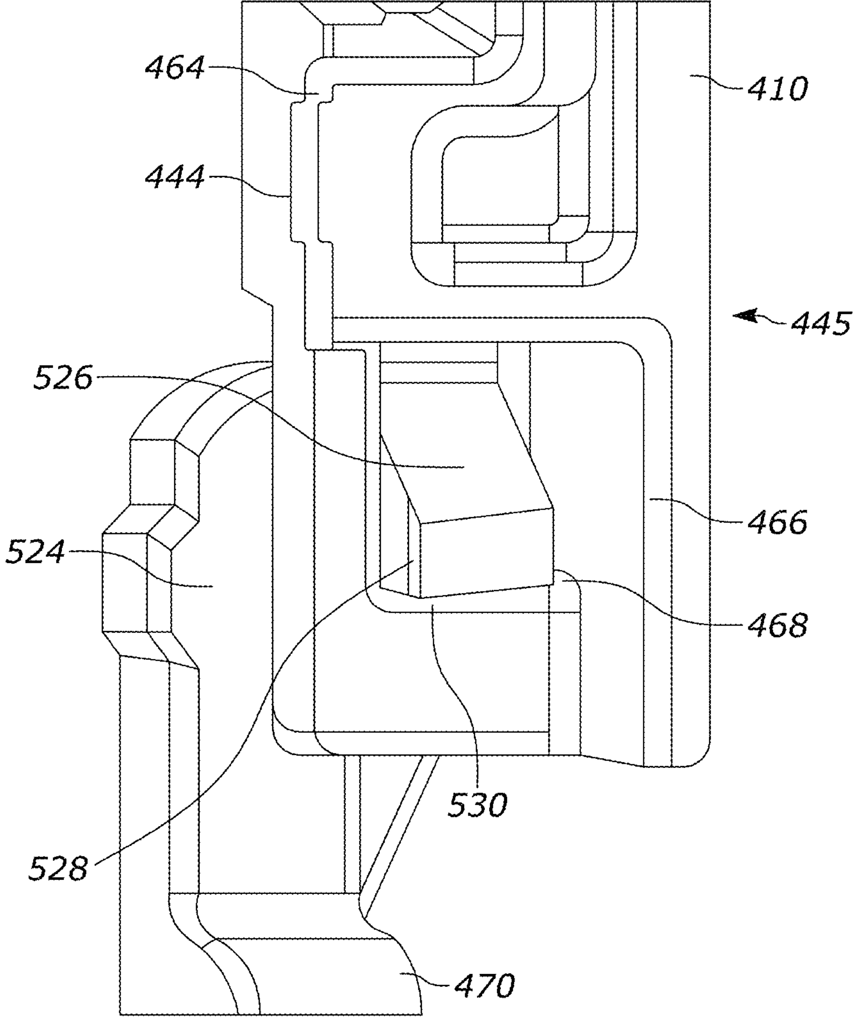
FIG. 14 is a detailed isometric view of one of the first actuator rods and one of the latches of the shape memory alloy actuator assembly of FIG. 4.

FIG. 14 is a detailed isometric view of one of the first actuator rods 444 and one of the latches 470 of the shape memory alloy actuator assembly 400 of FIG. 4. The latch 470 includes an end 524 including a ramp 526 and a catch 528. The second actuator rod 446 engages against the ramp 526 in operation as the second actuator rod 446 moves from the first position to the second position and rotates the latch 470 from the hold position to the release position. The latch 470 rotates from the release position and into the hold position after the catch 528 passes a lower surface 530 that defines the latch receptacle 468. The catch 528 engages the lower surface 530 and the ramp 526 extends into the latch receptacle 468 when the latch 470 is the hold position as shown.

Figure 15:
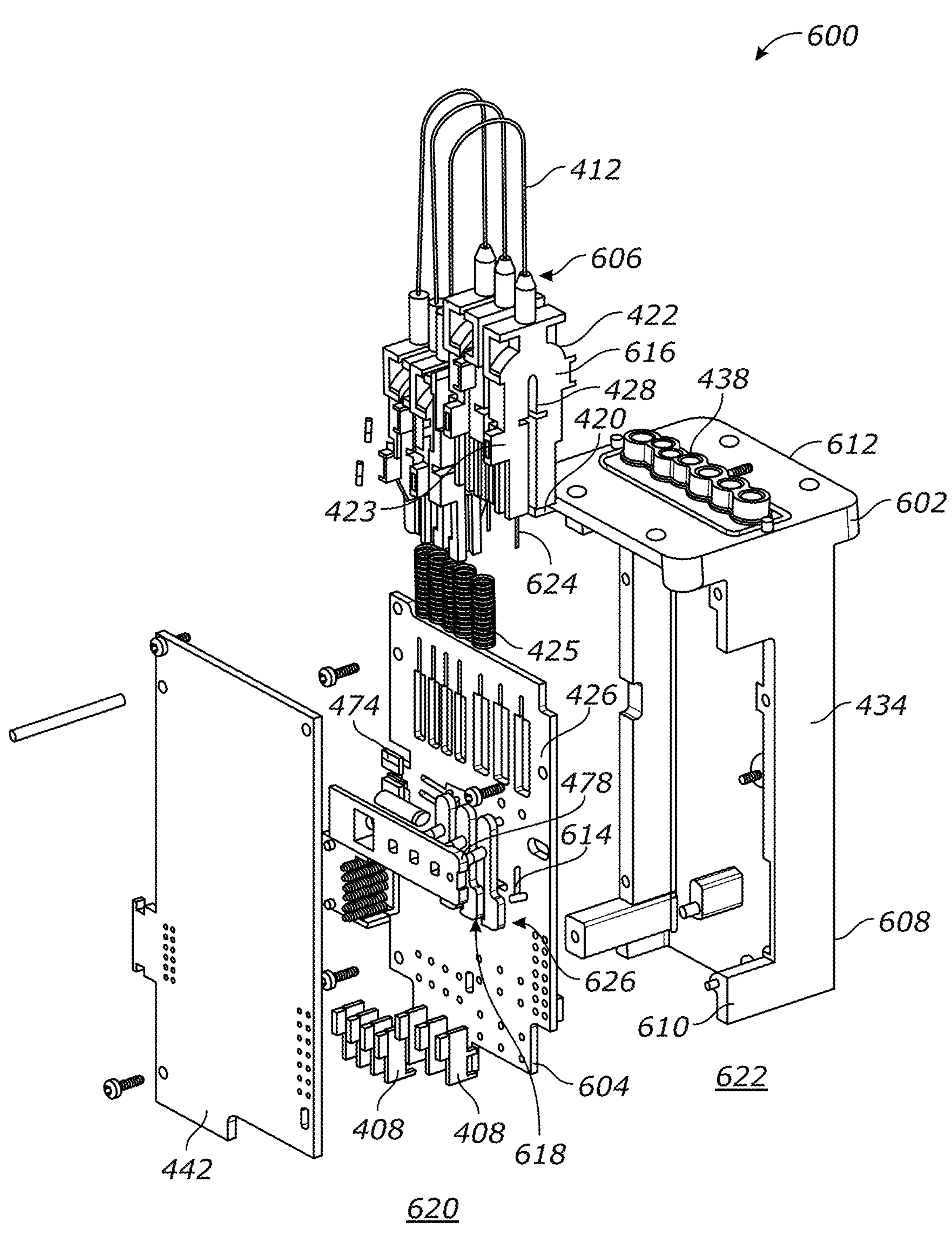
FIG. 15 is an expanded view of another example shape memory alloy actuator assembly that can be used to implement the valve drive assembly of FIG. 1.

FIG. 15 is an expanded view of another example shape memory alloy actuator assembly 600 that can be used to implement the valve drive assembly 118 of FIG. 1. The shape memory alloy actuator assembly 600 is similar to the shape memory alloy actuator assembly 400 of FIG. 4 but retains one or more of the actuator rods in the hold position in a different way.

The shape memory alloy actuator assembly 600 has a housing 602, a printed circuit board 604, and a plurality of shape memory alloy actuators 606. The housing 602 has a lateral side 608, transverse sections 610 extending from the lateral side 608, and an end plate 612. The printed circuit board 604 is to be coupled to the transverse sections 610 of the housing 602 and defines latch slots 614.

Each of the shape memory alloy actuators 606 has a pair of wire mounts 408, an actuator rod 616, a shape memory alloy wire 412, and a latch assembly 618. The pair of wire mounts 408 are coupled to opposing sides 620, 622 of the printed circuit board 604. The actuator rods 616 have a wire guide 422 and a spring wire 624 to be positioned in a corresponding latch slot 614. The spring wire 624 may be L-shaped. The shape memory alloy wire 412 is coupled to the wire mounts 408 and positioned around the wire guide 422 and the latch assembly 618 is coupled to the printed circuit board 604.

A voltage is applied to the shape memory alloy wire 412 in operation that retracts the shape memory alloy wire 412 and causes the corresponding actuator rod 616 to move between a first position and a second position. The actuator rod 616 moving from the first position to the second position moves the spring wire 624 within the latch slot 614 from a release position to a hold position where the spring wire 624 holds the corresponding actuator rods 616 in the second position. The latch assembly 618 also includes a latch actuator 626 that can move the spring wire 624 from the hold position to the release position.

Figure 16:
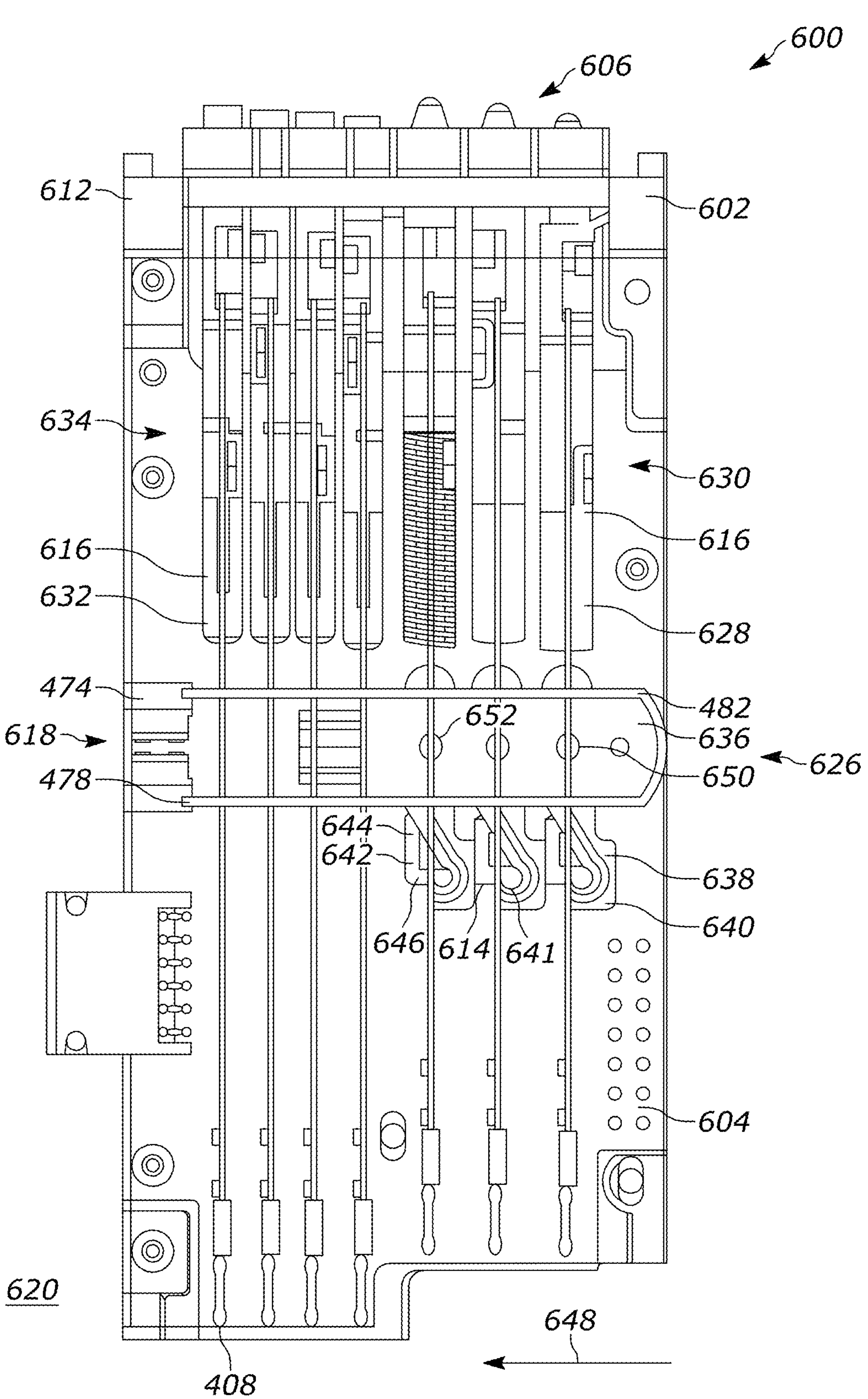
FIG. 16 is a plan view of the shape memory alloy actuator assembly of FIG. 15 showing the first side of the printed circuit board.

FIG. 16 is a plan view of the shape memory alloy actuator assembly 600 of FIG. 15 showing the first side 620 of the printed circuit board 604. The actuator rods 616 include first actuator rods 628 associated with first shape memory alloy actuators 630 and second actuator rods 632 associated with second shape memory alloy actuators 634 in the implementation shown. The latch assembly 618 may be used to hold the first actuator rods 628 in the second position and may not be used to hold the second actuator rods 632 in the second position. The latch assembly 618 may be used to hold both the first actuator rods 628 and the second actuator rods 632 in the second position in other implementations, however.

The latch actuator 626 of the latch assembly 618 includes a pair of wire mounts 474, a release bar 636 having a wire guide 482, and a shape memory alloy wire 478. The wire mounts 474 are coupled to the printed circuit board 604 and the shape memory alloy wire 478 is coupled to the wire mounts 474 and positioned around the wire guide 482 of the release bar 636. A voltage is applied to the shape memory alloy wire 478 of the latch actuator 626 in operation and the shape memory alloy wire 478 of the latch actuator 626 retracts and causes the release bar 636 to move between a first position and a second position and causes the spring wire(s) 624 to move from the hold position to the release position and, specifically, between the second leg 646 and the first leg 644.

The latch actuator 626 is shown including an arm 638 for each spring wire 624 that have a distal end 640 to engage the spring wire 624. The latch slot 614 is shown as an L-shaped slot 642 including a first leg 644 and a second leg 646. The distal end 640 of the arm 638 includes a hook 641 that engages the spring wire 624 to move the spring wire 624 from the hold position to the release position.

The first leg 644 of the latch slot 614 is substantially parallel to a longitudinal axis of the printed circuit board 604 and the second leg 646 of the latch slot 614 is substantially perpendicular to the longitudinal axis of the printed circuit board 604. The phrase "substantially perpendicular" means about +/−5 of perpendicular and/or accounts for manufacturing tolerances as set forth herein.

The spring wire 624 is positioned in the second leg 646 when the spring wire 624 is in the hold position and an interaction between the spring wire 624 and the printed circuit board 604 holds the associated first actuator rod 628 in the second position. The spring wire 624 is positioned in the first leg 644 when the spring wire 624 is in the release position. The latch assembly 618 can cause the first actuator rods 628 to be released from the second position by actuating the latch actuator 626 and using the hooks 641 on the distal ends 640 of the arms 638 to move the spring wire 624 in a direction generally indicated by arrow 648 out of the second leg 646 of the L-shaped slot 642 and into the first leg 644 of the L-shaped slot 642. The spring 425 may urge the actuator rod 616 toward the first position once the spring wire 624 is moved into the first leg 644 of the L-shaped slot 642.

Each of the arms 638 is coupled to the release bar 636 in the implementation shown. The arms 638 each have a protrusion 650 and the release bar 636 defines corresponding apertures 652 that receive the protrusions 650 to couple the arms 638 to the release bar 636.

Figure 17:
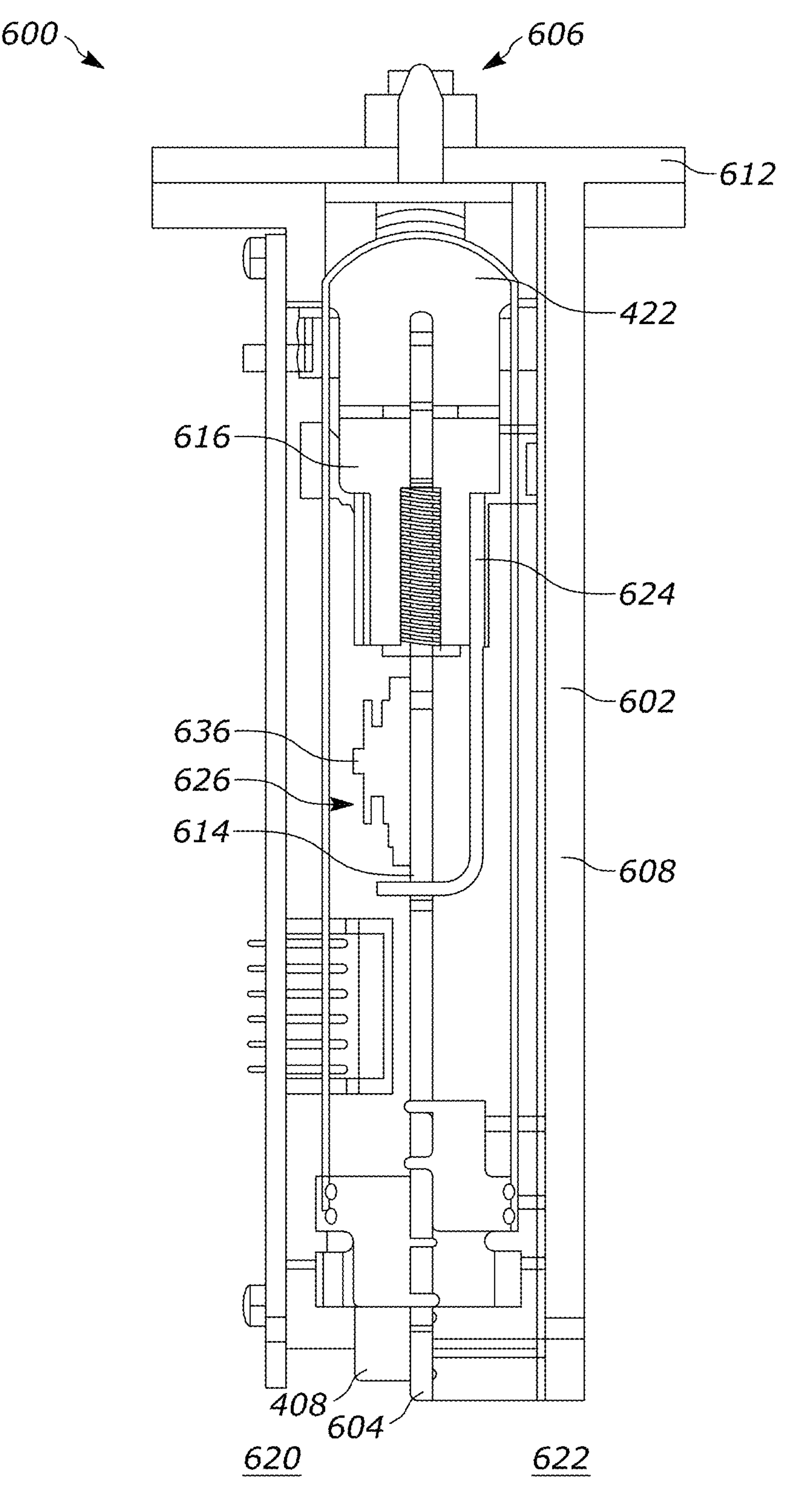
FIG. 17 is a side view of the shape memory alloy actuator assembly of FIG. 15 showing the spring wire positioned within the latch slot.

FIG. 17 is a side view of the shape memory alloy actuator assembly 600 of FIG. 15 showing the spring wire 624 positioned within the latch slot 614.

Figure 18:
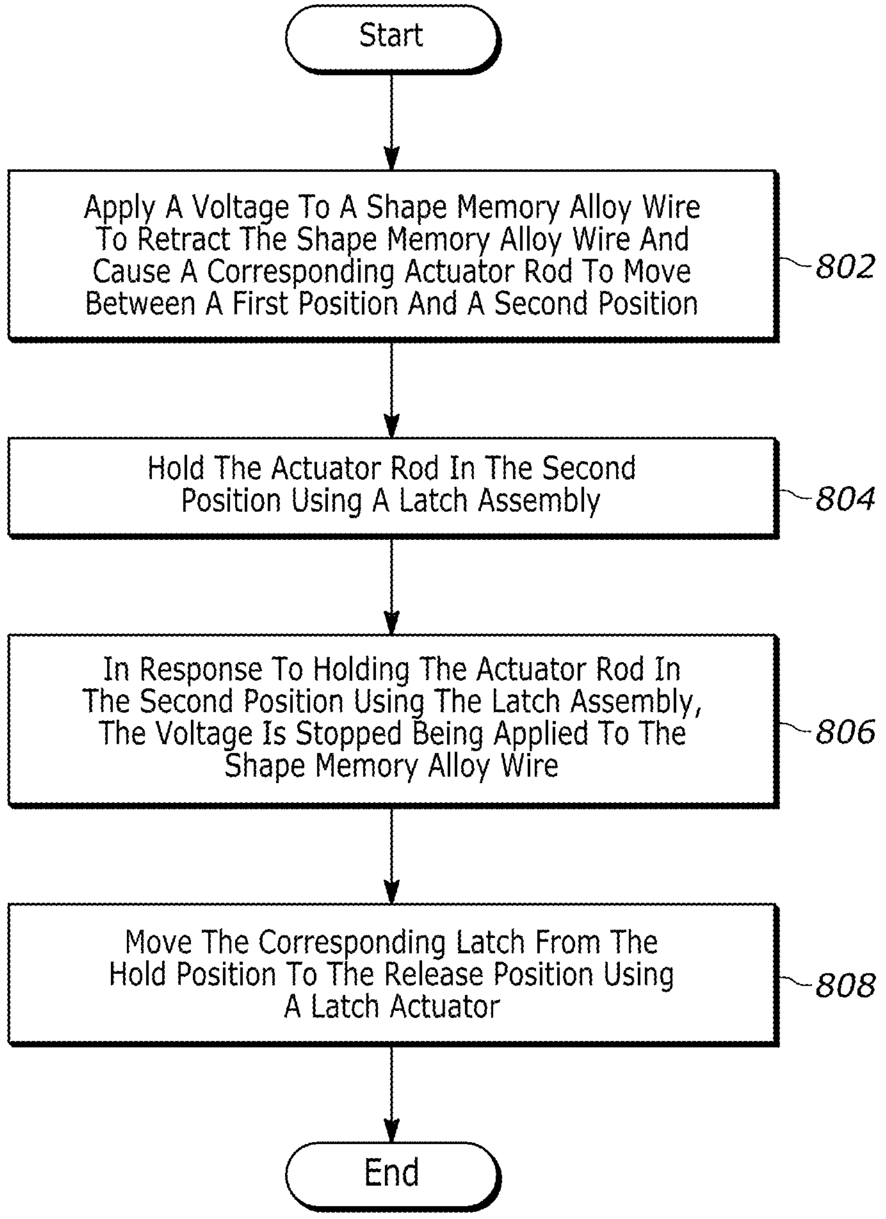
FIG. 18 illustrates a flowchart for a method of using the valve drive assembly of FIG. 1, the shape memory alloy actuator assembly of FIGS. 4-14, the shape memory alloy actuator assembly of FIGS. 15-17, and/or or any of the disclosed implementations.

FIG. 18 illustrates a flowchart for a method of using the valve drive assembly 118 of FIG. 1, the shape memory alloy actuator assembly 400 of FIGS. 4-14, the shape memory alloy actuator assembly 600 of FIGS. 15-17, and/or or any of the disclosed implementations. The order of execution of the blocks may be changed, and/or some of the blocks described may be changed, eliminated, combined, and/or subdivided into multiple blocks.

The process of FIG. 18 begins with a voltage being applied to a shape memory alloy wire 412 to retract the shape memory alloy wire 412 and cause a corresponding actuator rod 410 to move between a first position and a second position (Block 802). The actuator rod 410 is held in the second position using a latch assembly 448 (Block 804).

In response to holding the actuator rod 410 in the second position using the latch assembly 448, the voltage is stopped being applied to the shape memory alloy wire 412 (Block 806). The voltage not being being applied to the shape memory alloy wire 412 enables the shape memory alloy wire 412 to cool or relax while the latch assembly 448 holds the actuator rod 410 in the second position. The shape memory alloy wire 412 cools or relaxes in response to not being energized and substantially does not impede movement of the actuator rod 410 from the second position to the first position. The shape memory alloy wire 412 provides less or insignificant counter force to the associated first actuator rod 444 in a direction away from the first position when the shape memory alloy wire 412 is cooled and/or relaxed as an example.

The corresponding latch 470 is moved from the hold position to the release position using a latch actuator 472 (Block 808). The corresponding latch 470 is moved from the hold position to the release position by applying a voltage to a shape memory alloy wire 478 of the latch actuator 472 to retract the shape memory alloy wire 478 of the latch actuator 472. The release bar 476 of the latch actuator 472 is caused to move between a first position and a second position and the latch 470 is caused to move from the hold position to the release position in response to the latch actuator 472 being retracted. The latch 470 being moved from the hold position to the release position using the latch actuator 472 enables the associated actuator rod 410 to move from the second position to the first position.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or step recited in the singular and proceeded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising," "including," or "having" an element or a plurality of elements having a particular property may include additional elements whether or not they have that property. Moreover, the terms "comprising," including," having," or the like are interchangeably used herein.

The terms "connect," "connected," "contact" "coupled" and/or the like are broadly defined herein to encompass a variety of divergent arrangements and assembly techniques. These arrangements and techniques include, but are not limited to (1) the direct joining of one component and another component with no intervening components therebetween (i.e., the components are in direct physical contact); and (2) the joining of one component and another component with one or more components therebetween, provided that the one component being "connected to" or "contacting" or "coupled to" the other component is somehow in operative communication (e.g., electrically, fluidly, physically, optically, etc.) with the other component (notwithstanding the presence of one or more additional components therebetween). It is to be understood that some components that are in direct physical contact with one another may or may not be in electrical contact and/or fluid contact with one another. Moreover, two components that are electrically connected, electrically coupled, optically connected, optically coupled, fluidly connected or fluidly coupled may or may not be in direct physical contact, and one or more other components may be positioned therebetween.

The terms "substantially," "approximately," and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The terms "connect," "connected," "contact" "coupled" and/or the like are broadly defined herein to encompass a variety of divergent arrangements and assembly techniques. These arrangements and techniques include, but are not limited to (1) the direct joining of one component and another component with no intervening components therebetween (i.e., the components are in direct physical contact); and (2) the joining of one component and another component with one or more components therebetween, provided that the one component being "connected to" or "contacting" or "coupled to" the other component is somehow in operative communication (e.g., electrically, fluidly, physically, optically, etc.) with the other component (notwithstanding the presence of one or more additional components therebetween). It is to be understood that some components that are in direct physical contact with one another may or may not be in electrical contact and/or fluid contact with one another. Moreover, two components that are electrically connected, electrically coupled, optically connected, optically coupled, fluidly connected or fluidly coupled may or may not be in direct physical contact, and one or more other components may be positioned therebetween.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein

What is claimed is:

1. An apparatus, comprising:

a shape memory alloy actuator assembly, comprising:
- a housing;
- a printed circuit board coupled to the housing;
- a plurality of shape memory alloy actuators, each shape memory alloy actuator comprising:
  - a pair of wire mounts coupled to opposing sides of the printed circuit board;
  - an actuator rod comprising guide surfaces that define a guide slot that receives the printed circuit board and a wire guide; and
  - a shape memory alloy wire coupled to the wire mounts and positioned around the wire guide,
- wherein applying a voltage to the shape memory alloy wire retracts the shape memory alloy wire and causes the corresponding actuator rod to move between a first position and a second position, and
- wherein an interaction between the guide surfaces and the printed circuit board guide the movement of the corresponding actuator rod between the first position and the second position.

2. The apparatus of claim 1, wherein the guide surfaces of the actuator rods comprise a pair of protrusions that extend into the guide slot and interact with the printed circuit board.

3. The apparatus of claim 1, further comprising springs, wherein the printed circuit board defines spring apertures and wherein each spring aperture receives one of the springs, wherein each actuator rod comprises a spring seat that defines the guide slot and against which the corresponding spring seats.

4. The apparatus of claim 3, wherein the springs urge the corresponding actuator rod toward the first position, wherein the printed circuit board comprises a longitudinal axis and the springs have longitudinal axes, the longitudinal axes of the springs being substantially parallel to the longitudinal axis of the printed circuit board.

5. The apparatus of claim 1, wherein the housing comprising a lateral side, transverse sections extending from the lateral side, and an end plate, wherein the printed circuit board is coupled to the transverse sections of the housing.

6. The apparatus of claim 1, wherein the actuator rods comprise first actuator rods and second actuator rods, further comprising a latch assembly coupled to the printed circuit board to hold first actuator rods in the second position.

7. The apparatus of claim 1, wherein the printed circuit board has a first side and a second side and wherein the shape memory alloy wires each have a first portion on the first side of the printed circuit board and a second portion on the second side of the printed circuit board, the first portion being substantially parallel to the second portion.

8. An apparatus, comprising:

a shape memory alloy actuator assembly, comprising:
- a housing;
- a printed circuit board coupled to the housing;
- a plurality of shape memory alloy actuators, each shape memory alloy actuator comprising:
  - a pair of wire mounts coupled to opposing sides of the printed circuit board;
  - an actuator rod having a wire guide;
  - a shape memory alloy wire coupled to the wire mounts and positioned around the wire guide; and
  - a latch assembly coupled to the printed circuit board,
- wherein applying a voltage to the shape memory alloy wire retracts the shape memory alloy wire and causes the corresponding actuator rod to move between a first position and a second position, and
- wherein the latch assembly is to hold the actuator rods in the second position.

9. The apparatus of claim 8, wherein the actuator rods comprise a distal end defining a latch receptacle and wherein the latch assembly comprises a latch for each of the actuator rods, wherein the latches are movable between a release position and a hold position, wherein the latches are received within the latch receptacle and hold the corresponding actuator rods in the second position when the latch assembly is in the hold position.

10. The apparatus of claim 9, wherein the latch assembly further comprises a latch actuator to rotate the latches out of the latch receptacle and enable the latches to move from the hold position to the release position.

11. The apparatus of claim 10, wherein the latch actuator comprises:
- a pair of wire mounts coupled to the printed circuit board;
- a release bar having a first release bar portion having a wire guide;
- a shape memory alloy wire coupled to the wire mounts and positioned around the wire guide of the first release bar portion,
- wherein applying a voltage to the shape memory alloy wire of the latch actuator retracts the shape memory alloy wire of the latch actuator and causes the release bar to move between a first position and a second position and causes the latches to move from the hold position to the release position.

12. The apparatus of claim 11, wherein the release bar comprises a second release bar portion comprising release surfaces that define apertures and wherein each of the latches comprise a release protrusion, wherein movement of the release bar from the first position to the second position enables the release surfaces to engage the release protrusions and move the latches from the hold position to the release position.

13. The apparatus of claim 12, further comprising latch springs, and wherein each latch has a spring protrusion that receives one of the latch springs, each of the latch springs having an arm that engages the release protrusion of a corresponding latch to urge the latch toward the hold position, wherein the printed circuit board define latch spring apertures and wherein each spring has an arm received in a corresponding one of the latch spring apertures.

14. The apparatus of claim 9, wherein the printed circuit board comprises a latch aperture for each latch and each latch has a rotation protrusion that is received in the corresponding latch aperture and about which the latch rotates.

15. The apparatus of claim 11, further comprising a spring to urge the release bar from the second position to the first position, wherein the release bar comprises a spring housing in which the spring is positioned.

16. The apparatus of claim 12, wherein the printed circuit board comprises latch assembly apertures and wherein the first release bar portion and the second release bar portion are movably coupled through the latch assembly apertures.

17. An apparatus, comprising:

a shape memory alloy actuator assembly, comprising:

a housing comprising a lateral side, transverse sections extending from the lateral side, and an end plate;

a printed circuit board coupled to the transverse sections of the housing and defining latch slots;

a plurality of shape memory alloy actuators, each shape memory alloy actuator comprising:

a pair of wire mounts coupled to opposing sides of the printed circuit board;

an actuator rod comprising a wire guide and a spring wire positioned in a corresponding latch slot of the printed circuit board; and a shape memory alloy wire coupled to the wire mounts and positioned around the wire guide, wherein applying a voltage to the shape memory alloy wire retracts the shape memory alloy wire and causes the corresponding actuator rod to move between a first position and a second position, wherein the actuator rod moving from the first position to the second position moves the spring wire within the latch slot from a release position to a hold position where the spring wire holds the corresponding actuator rod in the second position.

18. The apparatus of claim 17, further comprising a latch actuator to move the spring wire from the hold position to the release position.

19. The apparatus of claim 18, wherein the latch actuator comprises:

a pair of wire mounts coupled to the printed circuit board;

a release bar having a wire guide;

a shape memory alloy wire coupled to the wire mounts and positioned around the wire guide of the release bar, wherein applying a voltage to the shape memory alloy wire of the latch actuator retracts the shape memory alloy wire of the latch actuator and causes the release bar to move between a first position and a second position and causes the spring wire to move from the hold position to the release position.

20. The apparatus of claim 19, wherein the latch actuator further comprises an arm for each spring wire, each of the arms have a distal end to engage the spring wire.

21. The apparatus of claim 20, wherein each of the arms are coupled to the release bar.

22. The apparatus of claim 20, wherein each of the arms comprise a protrusion and the release bar defines corresponding apertures that receive the protrusions to couple the arms to the release bar.

* * * * *